(12) United States Patent
Chou et al.

(10) Patent No.: US 8,586,242 B2
(45) Date of Patent: Nov. 19, 2013

(54) FERROUS PHOSPHATE POWDERS, LITHIUM IRON PHOSPHATE POWDERS FOR LI-ION BATTERY, AND METHODS FOR MANUFACTURING THE SAME

(71) Applicant: National Tsing Hua University, Hsinchu (TW)

(72) Inventors: Lih-Hsin Chou, Hsinchu (TW);
Hisn-Hsu Chu, Hsinchu (TW);
Bing-Kai Chen, Hsinchu (TW);
Yueh-ting Yang, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 13/908,393

(22) Filed: Jun. 3, 2013

(65) Prior Publication Data

US 2013/0266864 A1    Oct. 10, 2013

Related U.S. Application Data

(63) Continuation-in-part of application No. 13/524,287, filed on Jun. 15, 2012, now Pat. No. 8,481,211.

(30) Foreign Application Priority Data

Jun. 17, 2011  (TW) .............................. 100121234 A

(51) Int. Cl.
*H01M 4/13*      (2010.01)
(52) U.S. Cl.
USPC .......................... 429/221; 429/218.1; 423/306
(58) Field of Classification Search
None
See application file for complete search history.

(56) References Cited

U.S. PATENT DOCUMENTS

| | | | | |
|---|---|---|---|---|
| 5,982,073 | A * | 11/1999 | Lashmore et al. | 310/216.001 |
| 7,285,260 | B2 * | 10/2007 | Armand et al. | 423/306 |
| 7,781,100 | B2 * | 8/2010 | Liu et al. | 429/218.1 |
| 7,807,121 | B2 * | 10/2010 | Nuspl et al. | 423/306 |
| 2011/0068295 | A1 * | 3/2011 | Beck et al. | 252/182.1 |
| 2012/0321958 | A1 | 12/2012 | Chou et al. | |

FOREIGN PATENT DOCUMENTS

CN    101393982    3/2009

OTHER PUBLICATIONS

Liu et al., In situ immovilization of Cu(II) in soils using a new class of iron phosphate nanoparticles, Chemosphere 68 (2207) 1867-1876.*
Thinnappan et al., A combined experimental study of vivianite and As(V) reactivity in the pH range 2-11, Applied Geochemistry 23 (2008) 3187-3204.*
Franger et al., Comparison between diifferent LiFePO4 synthesis routes and their influence on its physical-chemical properties, Journal of Power Sources 119-121 (2003), pp. 252-257.*
Satyabrata et al., Size-Controlled Synthesis of Magnetite Nanoparticles in the Presence of Polyelectrolytes, Chem. Mater, 2004, 16, 3489-3496.*

(Continued)

*Primary Examiner* — Patrick Ryan
*Assistant Examiner* — Jose Colucci Rios

(57) ABSTRACT

Ferrous (II) phosphate ($Fe_3(PO_4)_2$) powders, lithium iron phosphate ($LiFePO_4$) powders for a Li-ion battery and methods for manufacturing the same are provided. The ferrous (II) phosphate powders are represented by the following formula (I):

$$Fe_{(3-x)}M_x(PO_4)_2 \cdot yH_2O \quad \text{(I)}$$

wherein, M, x, and y are defined in the specification, the ferrous (II) phosphate powders are composed of plural flake powders, and the length of each of the flake powders is 0.2-10 μm.

13 Claims, 26 Drawing Sheets

(56) References Cited

OTHER PUBLICATIONS

The Dictionary of Geology and Mineralogy, 2nd Edition, McGraw Hill, 2003.*

Mattievich et al., Hydrothermal Synthesis and Mossbauer Studies of Ferrous Phosphates of the Homologous Series Fe(3)2+(PO4)2(H2O)n.*

E. Mattievich and J. Danon, Hydrothermal synthesis and Mössbauer studies of ferrous phosphates of the homologous series Fe32+(PO4)2(H2O)n, Journal of Inorganic and Nuclear Chemistry, 1977, pp. 569-580.

Sylvain Franger, Frédéric Le Cras, Carole Bourbon, Hèléne Rouault, Comparison between different LiFePO4 synthesis routes and their influence on its phyhsico-chemical properties, Journal of Power Sources, 2003, pp. 252-257.

Satyabrata Si, Atanu Kotal, Tarun K. Mandal, Saurav Giri, Hiroyuki Nakamura and Takao Kohara, Size-Controlled Synthesis of Magnetite Nanoparticles in the Presence of Polyelectrolytes, chemistry of Materials, 2004, pp. 3489-3496.

Ruiqiang Liu and Dongye Zhao, In situ immobilization of Cu(II) in soils using a new class of iron phosphate nanoparticles, Chemosphere, 2007, p. 1867-1876.

V. Thinnappan, C.M. Merrifield, F.S. Islam, D.A. Polya, P. Wincott, R.A. Wogelius, A combined experimental study of vivianite and As (V) reactivity in the pH range 2-11, Applied Geochemistry, 2008, pp. 3187-3204.

Na Tian, Zhi-You Zhou and Shi-Gang Sun, Electrochemical preparation of Pd nanorods with high-index facets, Chemical Communications, 2009, p. 1502-1504.

Li Wang, Xiangming He, Wenting Sun, Jianlong Wang, Yadong Li and Shoushan Fan, Crystal Orientation Tuning of LiFePO4 Nanoplates for High Rate Lithium Battery Cathode Materials, Nano Letters, 2012, p. 5632-5636.

The Dictionary of Geology and Mineralogy, $2^{nd}$ Edition, McGraw Hill, 2003.

E. Mattievich and J. Danon, Hydrothermal synthesis and Mössbauer studies of ferrous phosphates of the homologous series Fe32+(PO4)2(H2O)n, Journal og Inorganic and Nuclear Chemistry 1977, pp. 569-580.

G. Arnold, J. Garche, R. Hemmer, S. Ströbele, C. Vogler, M. Wohlfahrt-Mehrens, Fine-particle lithium iron phosphate LiFePO4 synthesized by a new low-cost aqueous precipitation technique, Journal of Power Sources, 2003, pp. 247-251.

Sylvain Franger, Frédéric Le Cras, Carole Bourbon, Héléne Rouault, Comparison between different LiFePO4 synthesis routes and their influence on its physico-chemical properties, Journal of Power Sources, 2003, pp. 252-257.

Satyabrata Si, Atanu Kotal, Tarun K. Mandal, Saurav Giri, Hiroyuki Nakamura and Takao Kohara, Size-Controlled Syntheses of Magnetite Nanoparticles in the Presence of Polyelectrolytes, Chemistry of Materials, 2004, pp. 3489-3496.

Kaoru Dokko, Shohei Koizumi, Keisuke Sharaishi, Kiyoshi Kanamura, Electrochemical properties of LiFePO4 prepared via hydrothermal route, Journal of Power Sources, 2007, pp. 656-659.

Ruiqiang Liu and Dongye Zhao, In situ immobilization of Cu(ll) in soils using a new class of iron phosphate nanoparticles, chemosphere, 2007, p. 1867-1876.

V. Thinnappan, C.M. Merrifield, F.S. Islan, D.A. Polya, P. Wincott, R.A. Wogelius, A combined experimental study of vivianite and As (V) reactivity in the pH range 2-11, Applied Geochemistry, 2008, pp. 3187-3204.

Jinling Song, Ying Chu, Yang Liu, Lili Li and Wendong Sun, Room-temperature controllable fabrication of silver nanoplates reduced by aniline, Chemical Communications, 2008, pp. 1223-1225.

Na Tian, Zhi-You Zhou and Si-Gang Sun, Electrochemical preparation of Pd nanorods with high-index facets, Chemical Communications, 2009, p. 1502-1504.

Young Wook Lee, Minjung Kim and Sang Woo Han, Shaping Pd nanocatalysts through the control of reaction sequence, Chemical Communications, 2010, pp. 1535-1537.

Kuppan Saravanan, Palani Balaya, M.V. Reddy, B.V.R. Chowdari and Jagadese J. Vittal, Morphology controlled synthesis of LiFePO4/C nanoplates for Li-ion batteries, Energy & Enviornmental Science, 2010, pp. 457-464.

Shiliu Yang, Xufeng Zhou, Jiangang Zhang and Zhaoping Liu, Morphology-controlled solvothermal synthesisof LiFePO4 as a cathode material for lithium-ion batteries, Journal of Materials Chemistry, 2010, pp. 8086-8091.

Fei Teng, Sunand Santhanagopalan, Anjana Asthana, Xiaobao Geng, Sun-Il Mho, Reza Shahbazian-Yassar, Dennis Desheng MEng, Self-assembly of LiFO4 nanodendrites in a novel system of ethylene glycol-water, Journal of Crystal Growth, 2010, p. 3493-3502.

Xueai Li, Bin Zhang, Chunhua Ju, Xijiang Han, Yuchen Du and Ping Xu, Morphology-Controlled Synthesis and Electromagnetic Properties of Porous Fe3O4 Nanostructures from Iron Alkoxide Precursors, The Journal of Physical Chemistry, 2011, p. 12350-12357.

Song Qingzhu, Ou Xiuqin, Wang Li, Liang Guangchuan and Wang Zuorui, Effect of pH value on morphology and electrochemical properties of LiFePO4 by hydrothermal method, Materials Research Bulletin, 2011, p. 1398-1402.

Qiiang Wang, Weixin Zhang, Zeheng Yang, Shaoying Weng and Zhuojie Jin, Solvothermal synthesis of hierarchical LiFePO4 microflowers as cathode materials for lithium ion batteries, Journal of Power Sources, 2011, p. 10176-10182.

Li Wang, Xiangming He, Wenting Sun, Jianlong Wang, Yadong Li and Shoushan Fan, Crystal OrientationTuning og LiFePO4 Nanoplates for High Rate Lithium Battery Cathode Materials, Nano Letters, 2012, p. 5632-5636.

Y. Hong et al., "Preparation of Spherical $LiFePO_4$ Particies with Combined Process of Precipitation and Calcination and Their Characterization," The Chinese Journal of Process Engineering, vol. 8, No. 5, Oct. 2008, pp. 983-987.

* cited by examiner

FERROUS PHOSPHATE POWDERS, LITHIUM IRON PHOSPHATE POWDERS FOR LI-ION BATTERY, AND METHODS FOR MANUFACTURING THE SAME

CROSS REFERENCE TO RELATED APPLICATION

This application is a continuation-in-part (CIP) of U.S. Patent application for "Ferrous Phosphate Powders, Lithium Iron Phosphate Powders for Li-Ion Battery, and Methods for Manufacturing the Same", U.S. application Ser. No. 13/524,287, filed Jul. 15, 2012.

BACKGROUND OF THE INVENTION

1. Field of the Invention

The present invention relates to ferrous phosphate powders, lithium iron phosphate powders prepared therefrom, and methods for manufacturing the same. More specifically, the present invention relates to ferrous phosphate powders for preparing Li-ion batteries having large length to thickness ratio, lithium iron phosphate powders prepared therefrom, and methods for manufacturing the same.

2. Description of Related Art

As the development of various portable electronic devices continues, more and more attention focuses on the techniques of energy storage, and batteries are the main power supplies for these portable electronic devices. Among commercial batteries, small-sized secondary batteries are especially the major power supplies for portable electronic devices such as cell phones and notebooks. In addition, secondary batteries are applied to not only portable electronic devices, but also electric vehicles.

Among the developed secondary batteries, the lithium secondary batteries (also named as the Li-ion batteries) developed in 1990 are the most popular batteries used nowadays. The cathode material of the initial lithium secondary batteries is $LiCoO_2$. $LiCoO_2$ has the properties of high working voltage and stable charging and discharging voltage, so the secondary batteries which use $LiCoO_2$ as a cathode material are widely applied to portable electronic devices. Then, $LiFePO_4$ with an olivine structure and $LiMnO_4$ with a spinal structure were also developed as a cathode material for lithium secondary batteries. Compared to $LiCoO_2$, the safety of the batteries can be improved, the charge/discharge cycles can be increased, and the cost can be further reduced when LiFePO4 or $LiMn_2O_4$ is used as cathode material of secondary batteries.

Although the batteries which use $LiMn_2O_4$ as cathode materials have low cost and improved safety, the spinal structure of $LiMn_2O_4$ may collapse during the deep discharge process, due to Jahn-Teller effect. In this case, the cycle performance of the batteries may further be decreased. When $LiFePO_4$ is used as cathode material of batteries, the batteries also have the properties of low cost and improved safety. In addition, the capacity of $LiFePO_4$ is higher than that of $LiMn_2O_4$, so the batteries made from $LiFePO_4$ can further be applied to devices which need large current and high power. Furthermore, LiFePO4 is a non-toxic and environmentally friendly material, and also has great high temperature characteristics. Hence, $LiFePO_4$ is considered as an excellent cathode material for lithium batteries. Currently, the average discharge voltage of the lithium batteries using $LiFePO_4$ as a cathode material is 3.4~3.7 V vs. $Li^+/Li$.

A conventional structure of the Li-ion batteries comprises: a cathode, an anode, a separator, and a Li-containing electrolyte. The batteries perform the charge/discharge cycles by the lithium insertion and extraction mechanism, which is represented by the following equations (I) and (II).

$$\text{Charge:} LiFePO_4 - xLi^+ - xe^- \rightarrow xFePO_4 + (1-x)LiFePO_4 \qquad (I)$$

$$\text{Discharge:} FePO_4 + xLi^+ + xe^- \rightarrow xLiFePO_4 + (1-x)LiFePO_4 \qquad (II)$$

When a charge process of the batteries is performed, Li ions extract from the structure of $LiFePO_4$; and the Li ions insert into the structure of $FePO_4$ when a discharge process is performed. Hence, the charge/discharge process of the Li-ion batteries is a two-phase process of $LiFePO_4/FePO_4$.

Currently, the $LiFePO_4$ powders are usually prepared by a solid-state process. However, the property of the product is highly related to the sintering temperature of the solid-state process. When the sintering temperature is below 700° C., all the raw materials have to be mixed well. If the raw materials are not mixed well, $Fe^{3+}$ impurity phase will be present in the $LiFePO_4$ powders. When sintering temperature is below 600° C., the average grain size of the $LiFePO_4$ powders will be smaller than 30 μm. However, if the sintering temperature is increased, the average grain size of the $LiFePO_4$ powders will be larger than 30 μm. When the average grain size of the $LiFePO_4$ powders is larger than 30 μm, a grinding process and a sieving process have to be performed to obtain powders with specific grain size between 1 μm to 10 μm, in order to be used for preparing Li-ion batteries. Hence, in the case that the $LiFePO_4$ powders are prepared through a solid-state process, the grinding process and the sieving process have to be performed, which may increase the cost of the Li-ion batteries. In addition, the problem of large and non-uniform grain size of the $LiFePO_4$ powders may also occur.

Therefore, it is desirable to provide a method for manufacturing micro-sized, submicro-sized, even nano-sized cathode materials of Li-ion batteries in a simple way, in order to increase the charge/discharge efficiency of the batteries and reduce the cost thereof.

SUMMARY OF THE INVENTION

The object of the present invention is to provide ferrous (II) phosphate powders for manufacturing a cathode material of a Li-ion battery and a method for manufacturing the same, wherein the ferrous (II) phosphate powders have nano, micro, or sub-micro grain size and large length to thickness ratio, and can be applied to the current process for preparing lithium iron phosphate powders.

Another object of the present invention is to provide lithium iron phosphate powders for Li-ion batteries and a method for manufacturing the same, wherein the ferrous (H) phosphate powders of the present invention is used to manufacture the lithium iron phosphate powders. Hence, the sintered powders have uniform and small grain size in nano, micro, or sub-micro scale, so the grinding process and the sieving process can be omitted. Additionally, the obtained lithium iron phosphate powders have large length to thickness ratio, which can improve the charge/discharge efficiency of the Li-ion batteries.

To achieve the object, the method for manufacturing ferrous (II) phosphate powders of the present invention comprises the following steps: (A) providing a P-containing precursor solution, wherein the P-containing precursor solution comprises: a P-containing precursor; (B) adding a weakly alkaline compound into the P-containing precursor solution to obtain a mixture; and (C) adding a ferrous (II) compound into the mixture to obtain ferrous (II) phosphate powders.

In addition, the present invention also provides ferrous (II) phosphate powders, which are prepared through the aforementioned method, to apply to prepare cathode materials for Li-ion batteries. The ferrous (II) phosphate powders for manufacturing cathode materials of Li-ion batteries according to the present invention are represented by the following formula (I):

$$Fe_{(3-x)}M_x(PO_4)_2 \cdot yH_2O \quad (I)$$

wherein M comprises at least one metal selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, 0≤x<1.5, y is an integer of 0 to 8, the ferrous (II) phosphate powders are composed of plural flake powders, the length of each of the flake powders is 0.2-10 μm, and a ratio of the length and the thickness of each of the flake powder is in a range from 14 to 500.

In addition, the present invention also provides a method for manufacturing lithium iron phosphate powders for a Li-ion battery, wherein the aforementioned ferrous (II) phosphate powders are used as Fe-containing precursors. The method for manufacturing lithium iron phosphate powders of the present invention comprises the following steps: (a) providing the aforementioned ferrous (II) phosphate powders; (b) mixing the ferrous (II) phosphate powders with a Li-containing precursor to obtain mixed powders; and (c) heat-treating the mixed powders to obtain lithium iron phosphate powders.

When the aforementioned method for manufacturing lithium iron phosphate powders of the present invention is applied, the obtained lithium iron phosphate powders of the present invention are represented by the following formula (II):

$$LiFe_{(1-a)}M_aPO_4 \quad (II)$$

wherein M comprises at least one metal selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, 0≤a<0.5, the lithium iron phosphate powders are composed of plural flake powders, the length of each of the flake powders is 0.2-10 μm, and a ratio of the length and the thickness of each of the flake powder is in a range from 11 to 400.

The ferrous (II) phosphate powders for manufacturing cathode materials of Li-ion batteries of the present invention have uniform and small grain size in nano, micro, or sub-micro scale, and especially large length to thickness ratio. However, the grain size of the conventional ferrous (II) phosphate powders or the conventional ferrous phosphate precursors is large and un-uniform, so the sinter process (i.e. the heat-treating process) has to be performed for at least ten hours, in order to completely transform the ferrous (II) phosphate powders or the ferrous phosphate precursors into lithium iron phosphate. In addition, the grain size of the conventional sintered powders is usually large, so a grinding process and a sieving process have to be performed to obtain powders with specific size between 1 μm to 10 μm. However, the ferrous (II) phosphate powders of the present invention have uniform and small size, large length to thickness ratio, and specific shapes. Hence, the ferrous (II) phosphate powders can be completely transformed into lithium iron phosphate within several hours (less than 10 hours), so the time for the sintering process can be greatly reduced. In addition, the obtained lithium iron phosphate powders still have the similar size and the similar shape as those of the ferrous (II) phosphate powders after the sintering process, so the cathode materials of the Li-ion batteries can be obtained without performing the grinding process and the sieving process. Hence, when the ferrous (II) phosphate powders of the present invention are used to prepare lithium iron phosphate powders, the time for the sintering process can be reduced, and the grinding process and the sieving process can be omitted. Therefore, the cost for manufacturing the Li-ion batteries can be further reduced. In addition, the ferrous (II) phosphate powders of the present invention can be directly applied to the current production lines of lithium iron phosphate powders, so it is unnecessary to build new production lines for manufacturing lithium iron phosphate powders by use of the ferrous (II) phosphate powders of the present invention. Therefore, the cost for manufacturing the Li-ion batteries can be further reduced.

In the ferrous (II) phosphate powders or the lithium iron phosphate powders of the present invention, the flake powders are powders composed of independent flakes, flake powders that one end of each of the flake powders connects to each other, flake powders connecting to each other at the center of the flakes, or flake powders that one end of each of the flake powders connects to each other to form a connecting center. More preferably, the flake powders are independent flakes.

In addition, in the ferrous (II) phosphate powders or the lithium iron phosphate powders of the present invention, the thickness of each of the flake powder may be less than 60 nm. Preferably, the thickness thereof is 1-50 nm. More preferably, the thickness thereof is 4-45 nm. Most preferably, the thickness thereof is 7-35 nm, Since the thickness of the flake powders is in nano-scale, some of the flake powders are transparent or semi-transparent.

Furthermore, in the ferrous (II) phosphate powders or the lithium iron phosphate powders of the present invention, the ratio of the length and the thickness of each of the flake powder may be in a range from 10 to 500.

For the ferrous (II) phosphate powders of the present invention, preferably, the ratio of the length and the thickness of each of the flake powder is in a range from 14 to 500. More preferably, the ratio thereof is in a range from 20 to 400. Most preferably, the ratio thereof is in a range from 25 to 250 nm.

For the lithium iron phosphate powders of the present invention, preferably, the ratio of the length and the thickness of each of the flake powder is in a range from 11 to 400. More preferably the ratio thereof is in a range from 30 to 400.

Since the thickness of the ferrous (II) phosphate powders is in nano-scale, the sintering time for preparing the lithium iron phosphate powders can be greatly reduced and the grinding process and a sieving process can further be omitted. In addition, since the thickness of the lithium iron phosphate powders is also in nano-scale, the charge/discharge efficiency of the obtained Li-ion batteries can further be improved.

Furthermore, the ferrous (II) phosphate powders of the present invention are crystallized ferrous (II) phosphate powders, which may have a crystallization degree of more than 10%.

In addition, the ferrous (II) phosphate powders of the present invention shows different X-ray diffraction pattern from the conventional ferrous (II) phosphate bulk. More specifically, the ferrous (ID phosphate powders of the present invention shows an X-ray diffraction pattern 2θ angles (°) having characteristic peaks at about 18.32, 19.84, 23.24, 28.24, 30.32, 33.34, 35.88, 37.20, 39.36, 40.94, and 41.82. Preferably, the ferrous (II) phosphate powders of the present invention shows an X-ray diffraction pattern 2θ angles (°) having further characteristic peaks at about 20.72, 22.12, 24.86, 27.08, 34.3, and 44.14.

In the method for manufacturing ferrous (II) phosphate powders of the present invention, at least one metal-containing compound may further be added into the mixture to obtain the doped ferrous (II) phosphate powders in step (C), and the doped metal in the obtained ferrous (II) phosphate powders can increase the conductivity of the sequentially obtained lithium iron phosphate powders. Herein, the molar ratio of the metal-containing compound to the ferrous compound may be 1:1 to 1:999, i.e. the molar content of the metal-containing compound is 0.1-50% of that of the ferrous (II) phosphate powders. Preferably, the molar ratio of the metal-containing compound to the ferrous compound is 1:4 to 1:99, i.e. the molar content of the metal-containing compound is 1-20% of that of the ferrous (II) phosphate powders. In addition, the metal-containing compound can be any metal salt containing a doped metal of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, or Nb. Preferably, the metal-containing compounds are sulfates, carbonates, nitrates, oxalates, acetates, chlorites, bromides, or iodides of the aforementioned doped metals. More preferably, the metal-containing compounds are sulfates of the aforementioned doped metals. Most preferably, the metal-containing compounds are sulfates of Mn, Cr, Co, Cu, Ni, Zn, Al, or Mg.

Hence, in the ferrous (II) phosphate powders and the lithium iron phosphate powders of the present invention, M in the formula (I) and formula (II) respectively comprises at least one metal, which is preferably selected from the group consisting of Mn, Cr, Co, Cu, Ni, Zn, Al, and Mg. More preferably, the metal is selected from the group consisting of Mn, Co, Cu, Zn, Al, Ni, and Mg. In addition, preferably $0 \leq x < 0.5$ in formula (I). Furthermore, preferably $0 \leq a < 0.15$ in formula (II).

The method for manufacturing ferrous (II) phosphate powders of the present invention may further comprise a step (C1) after the step (C): washing the ferrous (II) phosphate powders. Herein, the ferrous (II) phosphate powders can be washed with ethanol, water, or a combination thereof. Preferably, the ferrous (II) phosphate powders are washed with deionized water. In addition, the method for manufacturing ferrous (II) phosphate powders of the present invention may further comprise a step (C2) after the step (C1): drying the obtained ferrous (II) phosphate powders. As the temperature of the drying process is increased, the time thereof can be reduced. Preferably, the ferrous (II) phosphate powders are dried at 40-120° C. for 5-100 hours. More preferably, the ferrous (II) phosphate powders are dried at 50-70° C. for 7-60 hours.

In the ferrous (II) phosphate powders and the lithium iron phosphate powders of the present invention, the length of each of the flake powders may be 0.2-10 μm. Preferably, the length of each of the flake powders is 0.2-5 μm. More preferably, the length thereof is 0.3-5 μm. Further preferably, the length thereof is 0.4-4 μm. Most preferably, the length thereof is 0.5-4 μm. In addition, the lithium iron phosphate powders of the present invention have olivine structures.

Furthermore, in the methods for manufacturing the ferrous (II) phosphate powders and the lithium iron phosphate powders of the present invention, the P-containing precursor can be at least one selected from the group consisting of $H_3PO_4$, $NaH_2PO_4$, $Na_2HPO_4$, $Mg_3(PO_4)_2$, and $NH_3H_2PO_4$. Preferably, the P-containing precursor is $H_3PO_4$, $NH_3H_2PO_4$, or a combination thereof.

In addition, in the methods for manufacturing the ferrous (II) phosphate powders and the lithium iron phosphate powders of the present invention, the weakly alkaline compound may be at least one selected from the group consisting of $Na_2CO_3$, and $NaHCO_3$. Preferably, the weakly alkaline compound is $NaHCO_3$.

Furthermore, in the methods for manufacturing the ferrous (II) phosphate powders and the lithium iron phosphate powders of the present invention, the ferrous (II) compound may be at least one selected from the group consisting of $FeCl_2$, $FeBr_2$, $FeI_2$, $FeSO_4$, $(NH_4)_2Fe(SO_4)_2$, $Fe(NO_3)_2$, $FeC_2O_4$, $(CH_3 COO)_2Fe$, and $FeCO_3$. Preferably, the ferrous compound is $FeCl_2$, $FeSO_4$, $(NH_4)_2Fe(SO_4)_2$, $FeCO_3$, or a combination thereof. More preferably, the ferrous compound is $FeSO_4$.

In the methods for manufacturing the lithium iron phosphate powders of the present invention, the Li-containing precursor may be at least one selected from the group consisting of LiOH, $Li_2CO_3$, $LiNO_3$, $CH_3COOLi$, $Li_2C_2O_4$, $Li_2SO_4$, LiCl, LiBr, LiI, $LiH_2PO_4$, $Li_2HPO_4$, and $Li_3PO_4$. Preferably, the Li-containing precursor is LiOH, $Li_2SO_4$, $LiH_2PO_4$, or $Li_3PO_4$. More preferably, the Li-containing precursor is $Li_3PO_4$.

In addition, in the methods for manufacturing the lithium iron phosphate powders of the present invention, the ferrous (II) phosphate powders are mixed with the Li-containing precursor and a carbon-containing material to obtain mixed powders in step (b). In this case, the surfaces of the obtained lithium iron phosphate powders are coated with carbon, so the conductivity of the obtained lithium iron phosphate powders can further be increased. In addition, the carbon-containing material can also inhibit the growth of the lithium iron phosphate powders, so the size of the lithium iron phosphate powders can be kept small. Herein, the carbon-containing material can be any sugar such as sucrose, and also be vitamin C (L-ascorbate). In addition, the additional amount of the carbon-containing material can be 0.1-40 wt % of the weight of the obtained lithium iron phosphate powders. Preferably, the additional amount of the carbon-containing material is 5-30 wt % of the weight of the obtained lithium iron phosphate powders.

In the methods for manufacturing the lithium iron phosphate powders of the present invention, the mixed powders can be heat-treated under an atmosphere or with an introduced gas flow to obtain the lithium iron phosphate powders, in step (c). Herein, the atmosphere or the introduced gas flow can be used as a protection gas or a reduction gas, which may comprise at least one selected from the group consisting of $N_2$, $H_2$, He, Ne, Ar, Kr, Xe, CO, methane, $N_2$—$H_2$ mixed gas, and a mixture thereof. Preferably, the protection gas or the reduction gas is $N_2$, $H_2$, or $N_2$—$H_2$ mixed gas. More preferably, the protection gas or the reduction gas is $N_2$—$H_2$ mixed gas.

Furthermore, in the methods for manufacturing the lithium iron phosphate powders of the present invention, the mixed powders are heat-treated at 300-800° C., preferably. In addition, the mixed powders are preferably heat-treated for 1-20 hours. More preferably, the mixed powders are heat-treated at 500-750° C. for 1-5 hours.

The obtained lithium iron phosphate powders of the present invention can be used as cathode materials to prepare Li-ion batteries, through any conventional method in the art. Here, the method for manufacturing the Li-ion batteries is simply described, but the present invention is not limited thereto.

An anode and a cathode are provided. Herein, the anode can be a Li-plate or an anode made by a carbon material, which is prepared by coating an anode current collector with a carbon material, and then drying and pressing the carbon material to form an anode for the Li-ion battery. The cathode current collector is coated with a cathode active material (i.e. the lithium iron phosphate powders of the present invention), and then the cathode active material is dried and pressed to form a cathode for the Li-ion battery. Next, a separator is inserted between the cathode and the anode, a Li-containing electrolyte is injected, and then a Li-ion battery is obtained after an assembling process.

Other objects, advantages, and novel features of the invention will become more apparent from the following detailed description when taken in conjunction with the accompanying drawings.

DETAILED DESCRIPTION OF THE PREFERRED EMBODIMENT

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

Embodiment 1

Preparation of Ferrous (II) Phosphate Powders $H_3PO_4$ was added in de-ionized water (500 ml) to obtain a P-containing precursor solution. Next, $NaHCO_3$ was added into the P-containing precursor solution to obtain a mixture, in which the molar ratio of $H_3PO_4$ to $NaHCO_3$ was 1:3. After the mixture was stirred for 30 min, ferrous sulfate hydrate ($FeSO_4 \cdot 8H_2O$) was added into the mixture, wherein the molar ratio of $FeSO_4 \cdot 8H_2O$ to $H_3PO_4$ was 3:2. After the reaction was completed, the product was washed with de ionized water, and then collected with centrifugation for twice. After the collected product was dried at 55° C. for 45 hours, ferrous (II) phosphate precursor powders ($Fe_3(PO_4)_2 \cdot 8H_2O$) were obtained.

Figure 1A:
FIGS. 1A-1F are SEM photos of ferrous (II) phosphate powders according to Embodiment 1 of the present invention.
Figure 1B:
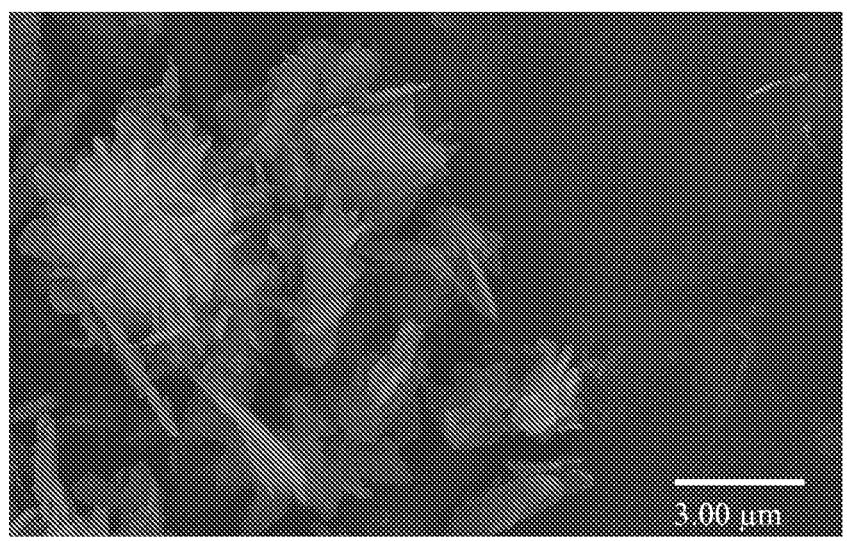
Figure 1C:
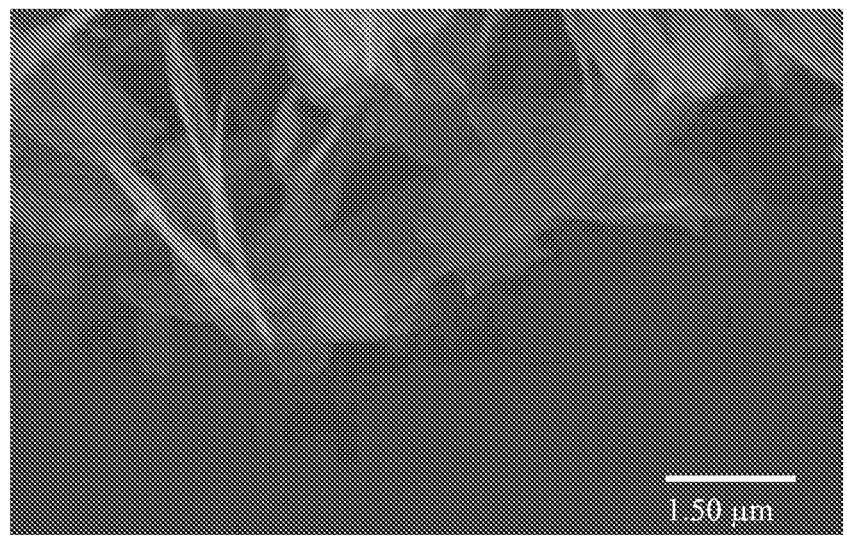
Figure 1D:
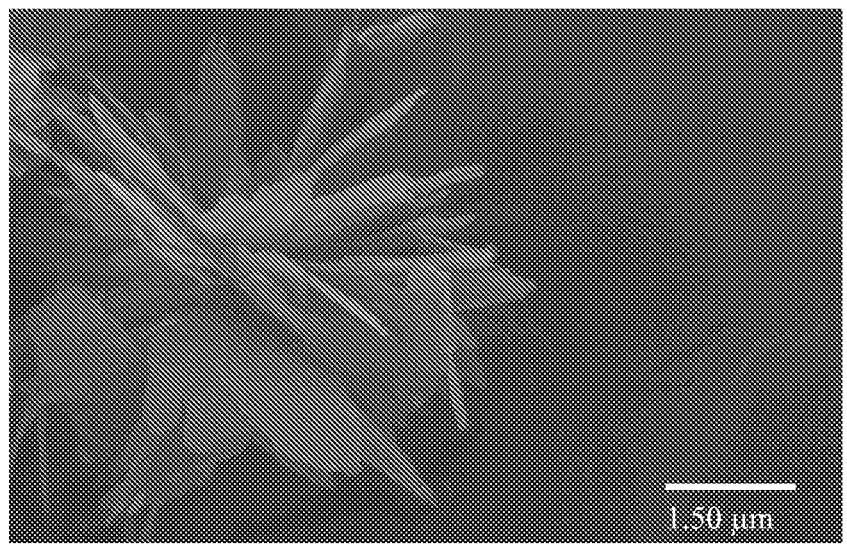
Figure 1E:
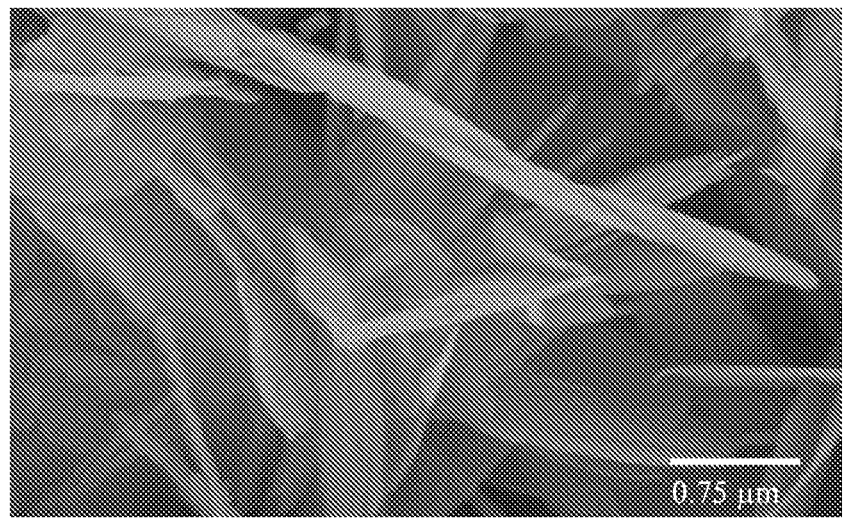
Figure 1F:
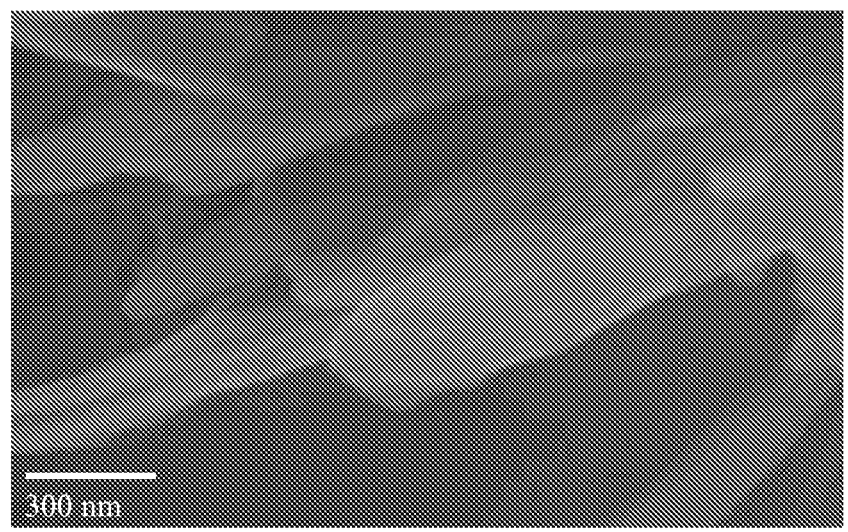

The shapes of the ferrous phosphate (II) powders of the present embodiment were observed with a scanning electron microscope (SEM) (Hitachi S-4000), and the results are shown in FIGS. 1A-1F, which are SEM photos of ferrous (II) phosphate powders observed at the magnification of 1,000×, 5,000×, 10,000×, 10,000×, 20,000× and 50,000×, respectively. As shown in FIG. 1A and FIG. 1B, the ferrous (II) phosphate powders have flat shapes in macro view. As shown in FIG. 1C, parts of the ferrous (II) phosphate powders are formed in independent flakes. As shown in FIG. 1D, flake powders in which one end of each of the flake powders connects to each other to form a connecting center are also observed. Among the observed powders shown in FIG. 1C and FIG. 1D, most of the powders are powders formed in independent flakes; and flake powders that one end of each of the flake powders connects to each other to form a connecting center are secondly observed. In addition, as shown in FIG. 1C and FIG. 1D, it can be found that partial flake powders are transparent or semi-transparent. Furthermore, as shown in FIG. 1E and FIG. 1F, not only transparent or semi-transparent flake powders can be observed, but also flake powders with partially cured peripheries can also be found. Furthermore, among the observed ferrous (II) phosphate powders, the length (L) of each of the flake powders is about 1-4 μm, and most of them is about 1.5-4 μm. The thickness (d) of each of the flake powders is about 10-30 nm. After calculation, the ratio of the length to the thickness (L/d) is approximately in a range from 50 to 400.

Figure 2A:
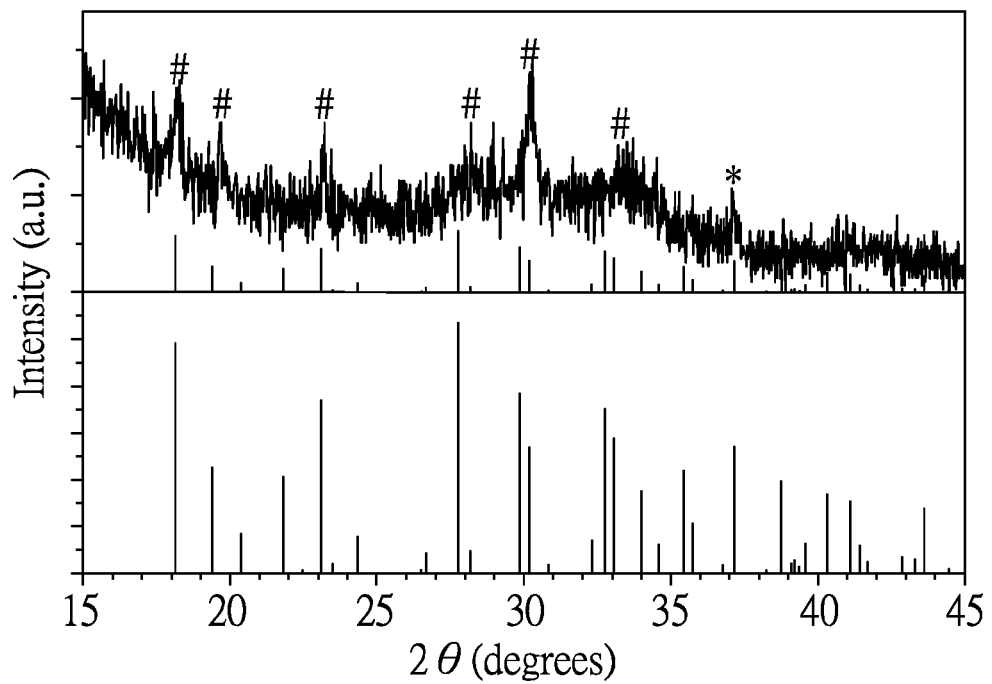
FIGS. 2A-2B are XRD diffraction patterns of ferrous (II) phosphate powders according to Embodiment 1 of the present invention.
Figure 2B:
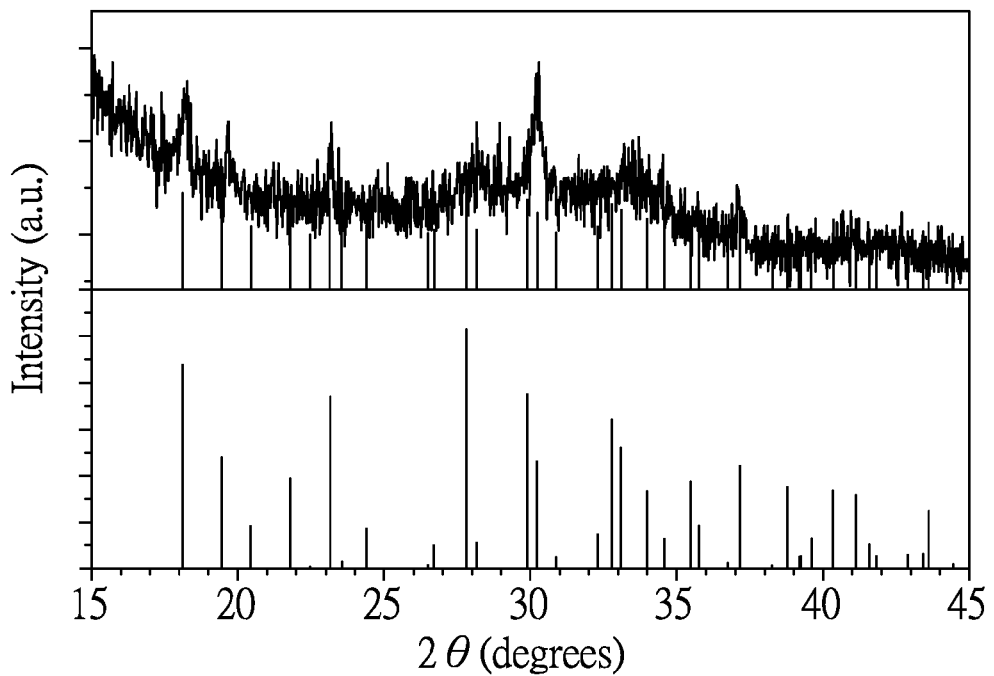

In addition, the obtained ferrous (II) phosphate powders of the present embodiment were also examined with an X-ray diffraction microscope (Shimadzu 6000) to understand the crystal structure thereof. The X-ray diffraction pattern was collected by Cu Kα radiation, the 2θ-scanning angle is 15°-45°, and the scanning rate is 1°/min. The obtained XRD diffraction pattern is shown in FIGS. 2A-2B, wherein the upper figures in each figure are the XRD diffraction patterns of ferrous (II) phosphate powders of the present embodiment, the lower figures in each figure respectively are the XRD diffraction patterns of ferrous (II) phosphate powders ($Fe_3(PO_4)_2 \cdot 8H_2O$) JCPDS Nos. 079-1928 and 083-2453, and lines in the upper figures are used to indicate the position of the peaks. As shown in FIG. 2A, only one characteristic peak is indicated by symbol "*", which indicates that this peak of the ferrous (II) phosphate powders of the present embodiment corresponds to the peak of ferrous (II) phosphate powders ($Fe_3(PO_4)_2 \cdot 8H_2O$) (JCPDS No. 079-1928). Other characteristic peaks are indicated by symbols "#", which indicate that these peaks do not correspond to the peaks of JCPDS No. 079-1928; and there are right shifts of about 0.1°-0.4° between the characteristic peaks indicated by symbols "#" and the corresponding peaks of JCPDS No, 079-1928. Except for the aforementioned characteristic peaks, no other peaks are observed in ferrous (II) phosphate powders of the present embodiment. This result indicates that all the ferrous (II) phosphate powders prepared according to the present embodiment are indeed ferrous (II) phosphate powders.

In addition, the ferrous (II) phosphate powders of the present embodiment were observed with a transmission electron microscope (TEM) (JEOL 2010), and the results (data not shown) show that about 10% of the powders are crystallized ferrous (II) phosphate powders and about 90% thereof are amorphous powders. From the results of SEM and TEM, it can be inferred that the low ratio of signal to noise is caused by the low crystallization degree and thin thickness.

Furthermore, the ferrous (H) phosphate powders of the present embodiment were analyzed with Inductively-coupled plasma mass spectrometry (ICP-MS). The results show that the atomic ratio of P to Fe (P/Fe) of the ferrous (II) phosphate powders of the present embodiment is 0.4/0.62=0.645, and that of standard $Fe_3(PO_4)_2$ powders is 2/3=0.667. This result indicates that the synthesized powders of the present embodiment has similar atomic ratio P/Fe to that of standard $Fe_3(PO_4)_2$ powders, and the deviation thereof is within the experimental range.

Preparation of Lithium Iron Phosphate Powders

Next, the ferrous (II) phosphate powders of the present embodiment was used as a precursor, and mixed with $Li_3PO_4$ in a molar ratio of 1:1. In addition, 15 wt % of sugar was also added in the mixture. The mixture was mixed with a 3D shaker containing 2 mm zirconia balls for 2 hr to obtain mixed powders. Then, the mixed powders were sintered at 750° C., under an atmosphere of $N_2$ gas for 3 hrs. Finally, $LiFePO_4$ powders coated with carbon and formed in flake shapes were obtained.

Figure 3A:
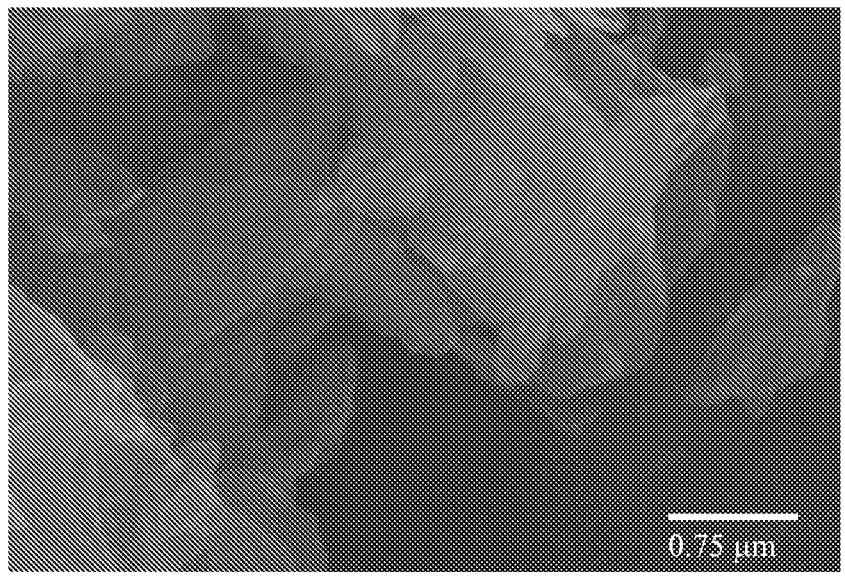
FIGS. 3A-3B are SEM photos of lithium iron phosphate powders according to Embodiment 1 of the present invention.
Figure 3B:
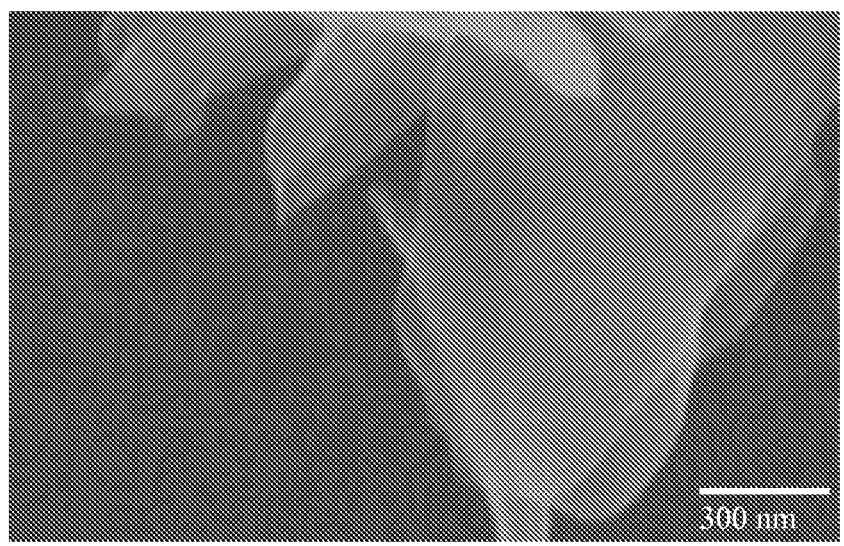

The shapes of the $LiFePO_4$ powders of the present embodiment were observed with a scanning electron microscope (SEM) (Hitachi S-4000), and the results are shown in FIGS. 3A-3B, which respectively are SEM photos of $LiFePO_4$ powders observed at the magnification of 20,000× and 50,000×. As shown in FIGS. 3A-3B, the sintered $LiFePO_4$ powders still have similar shape after the heat-treating process to that of the original ferrous (II) phosphate powders, and most of the powders are powders formed in independent flakes. In addition, even though the time for performing the sintering process is short, all the ferrous (II) phosphate powders can be transformed into $LiFePO_4$, due to the uniform and small size of the ferrous (II) phosphate powders. Furthermore, among the observed $LiFePO_4$ powders, the length (L) of each of the flake powders is about 0.6-3 μm, and most of them is about 1-3 μm. The thickness (d) of each of the flake powders is about 8-20 nm. After calculation, the ratio of the length to the thickness (L/d) is approximately in a range from 30 to 400. It should be noted that the thickness and the length of the $LiFePO_4$ powders are smaller than those of $LiFePO_4$ powders due to the ball milling and sintering process.

Furthermore, the obtained $LiFePO_4$ powders of the present embodiment were also examined with an X-ray diffraction microscope (Shimadzu 6000) to understand the crystal structure thereof. The X-ray diffraction pattern was collected by Cu Kα radiation, the 2θ-scanning angle is 15°-45°, and the scanning rate is 1°/min. The obtained XRD diffraction pattern is shown in FIG. 4, wherein the upper figure is the XRD diffraction pattern of $LiFePO_4$ powders of the present embodiment, the lower figure is the XRD diffraction pattern of $LiFePO_4$ crystal with an olivine structure (JCPDS No. 081-1173), and lines in the upper figure are used to indicate the position of the peaks.

Figure 4:
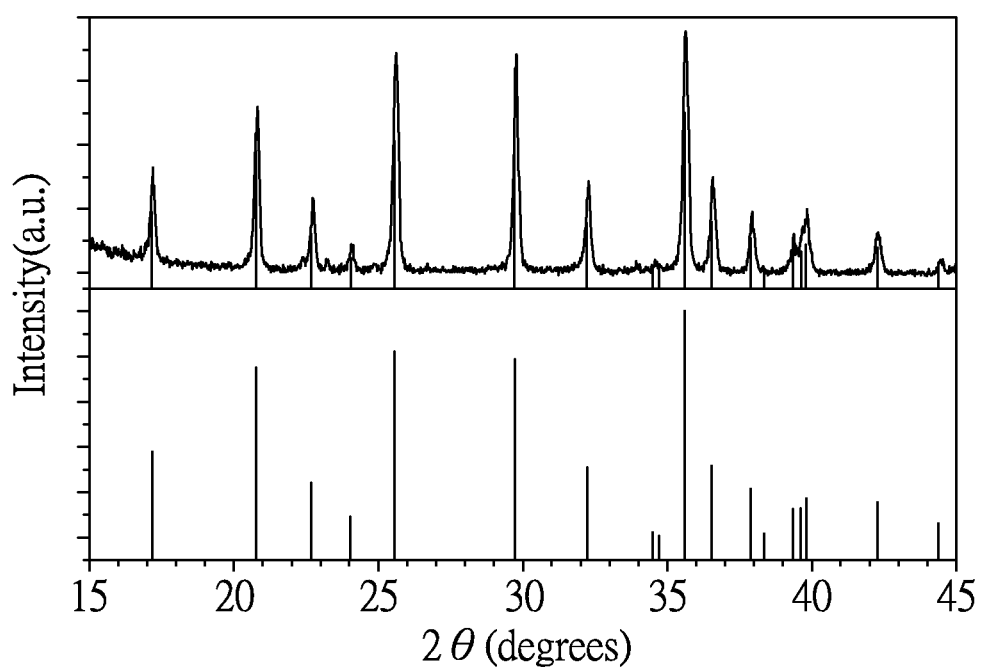
FIG. 4 is an XRD diffraction pattern of lithium iron phosphate powders according to Embodiment 1 of the present invention.

As shown in FIG. 4, all the lines indicating the peaks of the $LiFePO_4$ powders of the present embodiment correspond to the peaks of $LiFePO_4$ crystal with the olivine structure (JCPDS No. 081-1173), and there are no other peaks observed in the $LiFePO_4$ powders of the present embodiment. This result indicates that all the $LiFePO_4$ powders of the present embodiment are $LiFePO_4$ powders with olivine structures.

Embodiment 2

Preparation of Ferrous (II) Phosphate Powders $H_3PO_4$ was added in deionized water (500 ml) to obtain a P-containing precursor solution. Next, $NaHCO_3$ was added into the P-containing precursor solution to obtain a mixture, in which the molar ratio of $H_3PO_4$ to $NaHCO_3$ was 1:3. After the mixture was stirred for 30 min, ferrous sulfate hydrate ($FeSO_4 \cdot 8H_2O$) and manganese sulfate hydrate ($MnSO_4 \cdot 5H_2O$) was added into the mixture, wherein the molar ratio of $FeSO_4 \cdot 8H_2O$ to $MnSO_4 \cdot 6H_2O$ was 9:1, and the molar ratio of the total amount of $FeSO_4 \cdot 8H_2O$ and $MgSO_4 \cdot 6H_2O$ to $H_3PO_4$ was 3:2. After the reaction was completed, the product was washed with deionized water, and then collected with centrifugation twice. After the collected product was dried at 55° C. for at least 36 hours, ferrous (II) phosphate precursor powders doped with Mn ($Fe_{2.7}Mn_{0.3}(PO_4)_2 \cdot 8H_2O$) were obtained.

Figure 5A:
FIGS. 5A-5B are SEM photos of ferrous (II) phosphate powders doped with Mn according to Embodiment 2 of the present invention.
Figure 5B:

The shapes of the ferrous (II) phosphate precursor powders doped with Mn of the present embodiment were also observed with a scanning electron microscope (SEM) (Hitachi S-4000), and the results are shown in FIGS. 5A-5B, which respectively are SEM photos of ferrous (II) phosphate powders observed at the magnification of 10,000× and 50,000×. As shown in FIG. 5A, it was observed that the powders are composed of plural flake powders. More specifically, the powders are powders composed of independent flakes, flake powders that one end of each of the flake powders connects to each other to form a connecting center, or flake powders connecting to each other at the center of the flakes. Herein, among the observed ferrous (II) phosphate powders of the present embodiment, the length (L) of each of the flake powders is about 0.3-3 μm, and most of them is about 1-3 μm. The thickness (d) of each of the flake powders is about 10-22 nm. After calculation, the ratio of the length to the thickness (L/d) is approximately in a range from 15 to 300.

Preparation of Lithium Iron Phosphate Powders

Next, the ferrous (II) phosphate powders doped with Mn of the present embodiment was used as a precursor, and mixed with $Li_3PO_4$ in a molar ratio of 1:1. In addition, 15 wt % of sugar was also added in the mixture. The mixture was mixed with a 3D shaker containing 2 mm zirconia balls for 2 hrs to obtain mixed powders. Then, the mixed powders were heat-treated at 750° C., under an atmosphere of $N_2$ gas for 3 hrs. Finally, lithium iron phosphate powders coated with carbon and doped with Mn ($LiFe_{0.9}Mn_{0.1}PO_4/C$) and which were formed in flake shapes, were obtained.

Figure 6A:
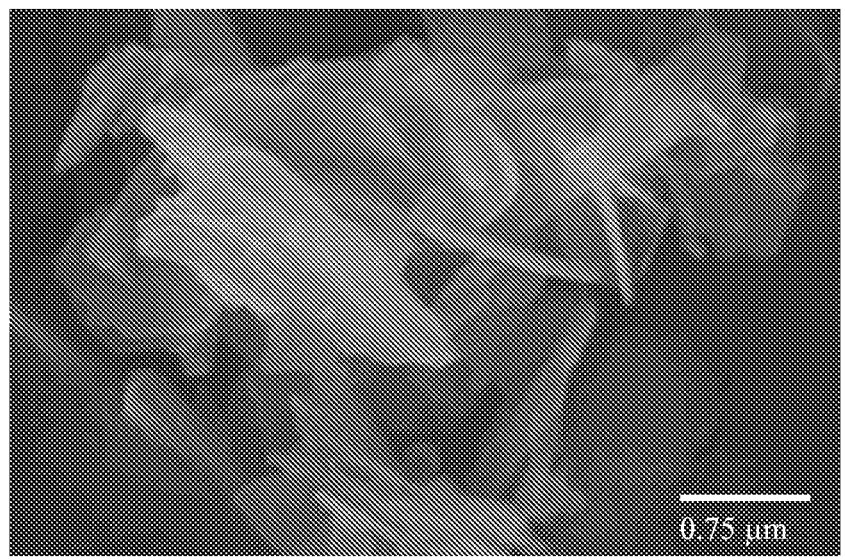
FIGS. 6A-6B are SEM photos of lithium iron phosphate powders doped with Mn according to Embodiment 2 of the present invention.
Figure 6B:
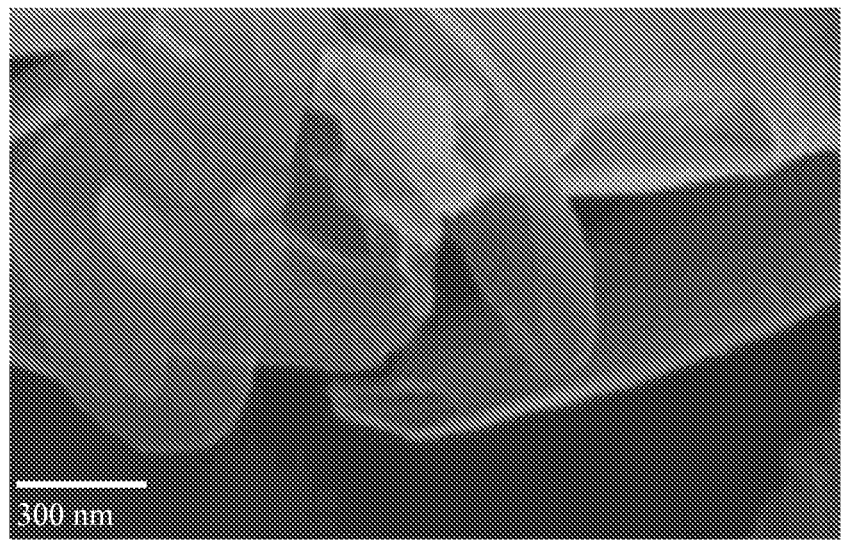

The shapes of the lithium iron phosphate powders doped with Mn of the present embodiment were also observed with a scanning electron microscope (SEM) (Hitachi S-4000), and the results are shown in FIGS. 6A-6B, which respectively are SEM photos of $LiFePO_4$ powders observed at the magnification of 20,000× and 50,000×. The result shows that the lithium iron phosphate powders doped with Mn of the present embodiment have similar shape to that of ferrous (II) phosphate powders doped with Mn, and especially most of the powders are powders formed in independent flakes; and flake powders that one end of each of the flake powders connects to each other to form a connecting center are secondly observed.

Furthermore, among the observed $LiFePO_4$ powders, the length (L) of each of the flake powders is about 0.9-3 μm, and most of them is about 1-3 μm. The thickness (d) of each of the flake powders is about 7-20 nm. After calculation, the ratio of the length to the thickness (L/d) is approximately in a range from 45 to 430.

Embodiment 3

The ferrous (II) phosphate precursor powders doped with Mg of the present embodiment were prepared through the same process as illustrated in Embodiment 2, except that the $MnSO_4.5H_2O$ was substituted with magnesium nitrate hydrate ($MgN_2O_6.6H_2O$) in the present embodiment. In addition, the lithium iron phosphate powders doped with Mg of the present embodiment were also prepared through the same process as illustrated in Embodiment 2, except that the ferrous (II) phosphate precursor powders doped with Mn used in the Embodiment 2 were substituted with ferrous (II) phosphate precursor powders doped with Mg prepared in the present embodiment.

After preparation, ferrous (II) phosphate precursor powders doped with Mg ($Fe_{2.7}Mg_{0.3}(PO_4)_2.8H_2O$) and lithium iron phosphate powders coated with carbon and doped with Mg ($LiFe_{0.9}Mg_{0.1}PO_4/C$) were obtained.

Figure 7A:
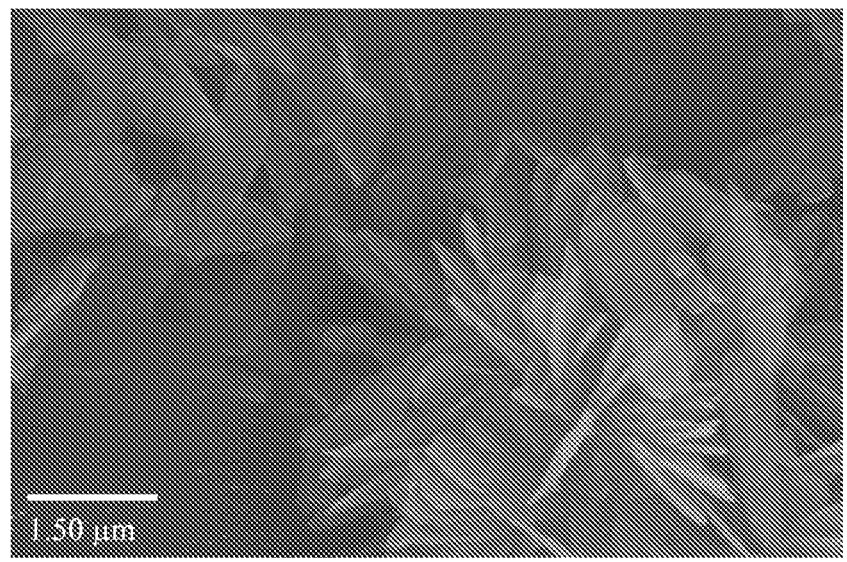
FIGS. 7A-7B are SEM photos of ferrous (II) phosphate powders doped with Mg according to Embodiment 3 of the present invention.
Figure 7B:
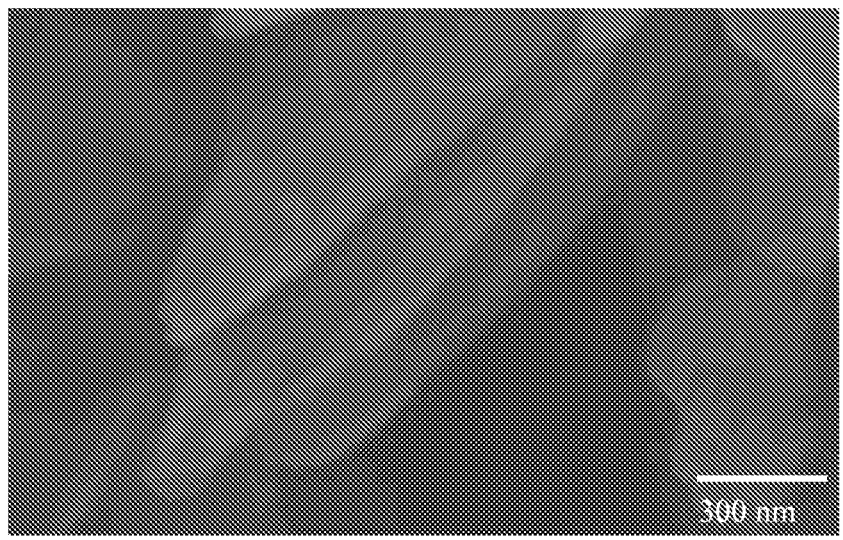
Figure 8A:
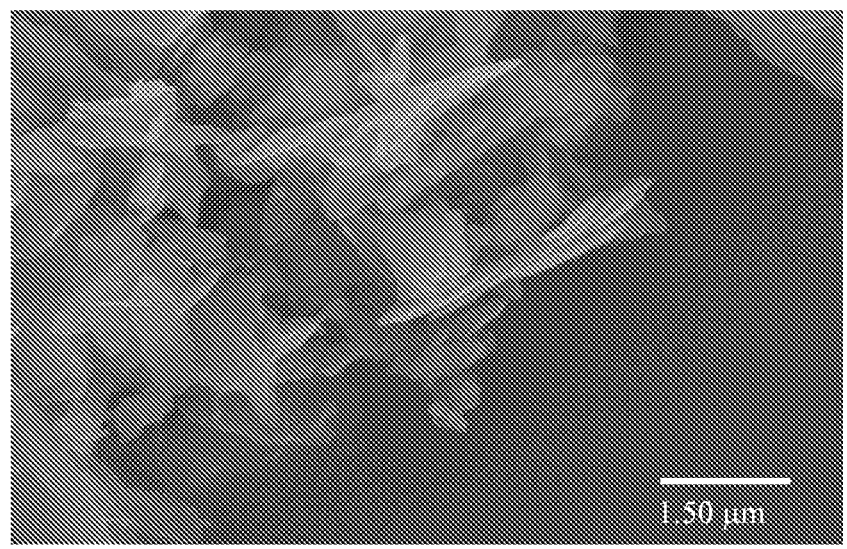
FIGS. 8A-8B are SEM photos of lithium iron phosphate powders doped with Mg according to Embodiment 3 of the present invention.
Figure 8B:
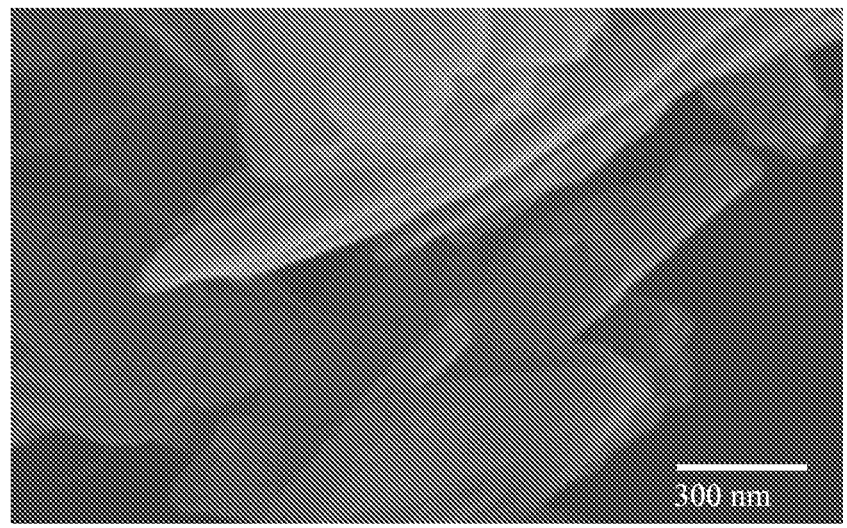

The shapes of the ferrous (II) phosphate precursor powders and lithium iron phosphate powders doped with Mg of the present embodiment were also respectively observed with a scanning electron microscope (SEM) (Hitachi S-4000), and the results thereof are respectively shown in FIGS. 7A-7B and FIGS. 8A-8B. FIGS. 7A and 7B are SEM photos of ferrous (II) phosphate powders of the present embodiment observed at the magnification of 10,000× and 50,000×, respectively; and FIGS. 8A and 8B are SEM photos of $LiFePO_4$ powders observed at the magnification of 10,000× and 50,000×, respectively.

Among the observed ferrous (II) phosphate powders doped with Mg of the present embodiment, the length (L) of each of the flake powders is about 0.3-2.5 μm, and most of them is about 1-2.5 μm. The thickness (d) of each of the flake powders is about 10-22 nm. After calculation, the ratio of the length to the thickness (L/d) is approximately in a range of 14-250.

In addition, among the observed $LiFePO_4$ powders doped with Mg of the present invention, the length (L) of each of the flake powders is about 0.75-2.5 μm, and most of them is about 1-2.5 μm. The thickness (d) of each of the flake powders is about 8-20 nm, After calculation, the ratio of the length to the thickness (L/d) is approximately in a range of 40-300.

Figure 9:
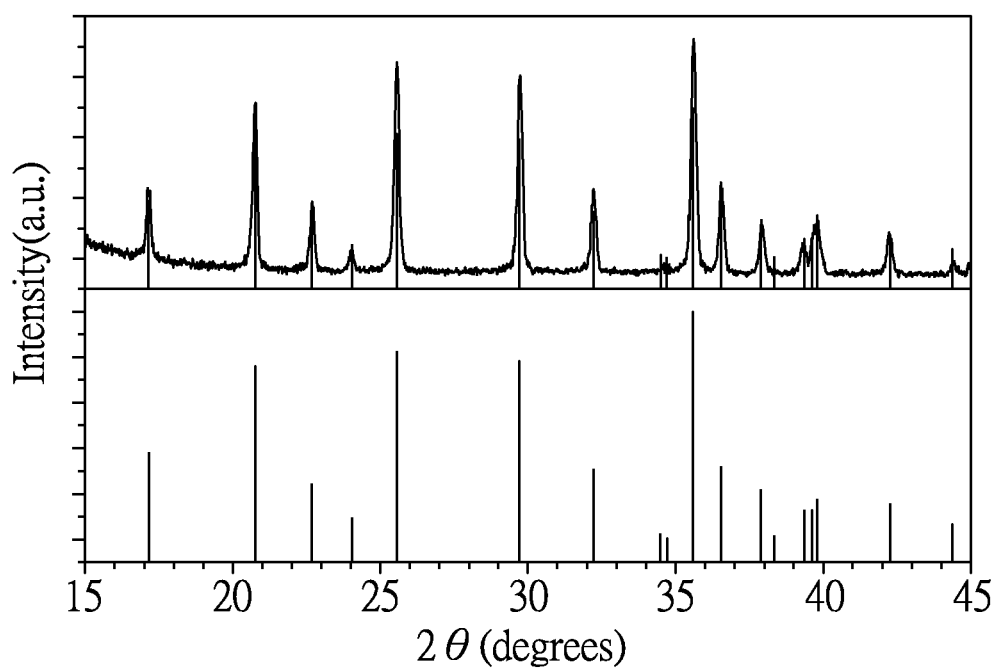
FIG. 9 is an XRD diffraction pattern of lithium iron phosphate powders doped with Mg according to Embodiment 3 of the present invention.

In addition, the obtained lithium iron phosphate powders doped with Mg of the present embodiment were also examined with an X-ray diffraction microscope (Shimadzu 6000) to understand the crystal structure thereof. The X-ray diffraction pattern was collected by Cu Kα radiation, the 2θ-scanning angle is 15°-45°, and the scanning rate is 1°/min. The obtained XRD diffraction pattern is shown in FIG. 9, wherein the upper figure is the XRD diffraction pattern of lithium iron phosphate powders doped with Mg of the present embodiment, the lower figure is the XRD diffraction pattern of $LiFePO_4$ crystal with an olivine structure (JCPDS No. 081-1173), and lines in the upper figure are used to indicate the position of the peaks. The result indicates that all the lithium iron phosphate powders doped with Mg of the present embodiment have olivine structures.

Embodiment 4

The ferrous (II) phosphate precursor powders doped with Mg of the present embodiment were prepared through the same process as illustrated in Embodiment 2, except that the $MnSO_4.5H_2O$ was substituted with $MgN_2O_6.6H_2O$ and nickel nitrate hydrate ($Ni(NO_3)_2.6H_2O$) and the molar ratio of $FeSO_4.8H_2O:MgN_2O_6.6H_2O:Ni(NO_3)_2.6H_2O$ was 8:1:1 in the present embodiment. In addition, the lithium iron phosphate powders doped with Mg and Ni of the present embodiment were also prepared through the same process as illustrated in Embodiment 2, except that the ferrous (II) phosphate precursor powders doped with Mn used in the Embodiment 2 were substituted with ferrous (II) phosphate precursor powders doped with Mg and Ni prepared in the present embodiment.

After preparation, ferrous (II) phosphate precursor powders doped with Mg and Ni ($Fe_{2.4}Mg_{0.3}Ni_{0.3}(PO_4)_2.8H_2O$) and lithium iron phosphate powders coated with carbon and doped with Mg and Ni ($LiFe_{0.8}Mg_{0.1}Ni_{0.1}PO_4/C$) were obtained.

Among the observed ferrous (II) phosphate powders doped with Mg and Ni of the present embodiment, the length (L) of each of the flake powders is about 0.3-2.7 μm, and most of them is about 1-2.7 μm. The thickness (d) of each of the flake powders is about 10-22 nm. After calculation, the ratio of the length to the thickness (L/d) is approximately in a range of 14-270.

In addition, among the observed $LiFePO_4$ powders doped with Mg and Ni of the present invention, the length (L) of each of the flake powders is about 0.5-2 μm, and most of them is about 1-1.7 μm. The thickness (d) of each of the flake powders is about 7-20 nm. After calculation, the ratio of the length to the thickness (L/d) is approximately in a range of 25-300.

The ferrous (II) phosphate powders doped with Ni and Mg of the present embodiment were analyzed with Inductively-coupled plasma mass spectrometry (ICP-MS). The results show that the atomic ratio of P to Fe (P/(Fe+Ni+Mg)) of the ferrous (II) phosphate powders doped with Ni and Mg of the present embodiment is 0.39/(0.042+0.49+0.056)=0.663, and that of standard $Fe_3(PO_4)_2$ powders is 2/3=0.667. This result indicates that the synthesized powders doped with Ni and Mg of the present embodiment has similar atomic ratio P/Fe to that of standard $Fe_3(PO_4)_2$ powders, and the deviation thereof is within the experimental range.

In addition, the ferrous (II) phosphate powders doped with Ni and Mg of the present embodiment were observed with a transmission electron microscope (TEM) (JEOL 2010), and the results (data not shown) show that about 15% of the powders are crystallized ferrous (II) phosphate powders and about 85% thereof are amorphous powders.

The obtained ferrous (II) phosphate powders doped with Mg and Ni of the present embodiment were also examined with an X-ray diffraction microscope (Shimadzu 6000) through the same process as illustrated in Embodiment 1, to understand the crystal structure thereof. The obtained XRD diffraction pattern is shown in FIG. 10, wherein the upper figure is the XRD diffraction pattern of ferrous (II) phosphate powders of the present embodiment, the lower figure is the XRD diffraction pattern of ferrous (II) phosphate powders ($Fe_3(PO_4)_2 \cdot 8H_2O$) JCPDS No. 079-1928.

Figure 10:
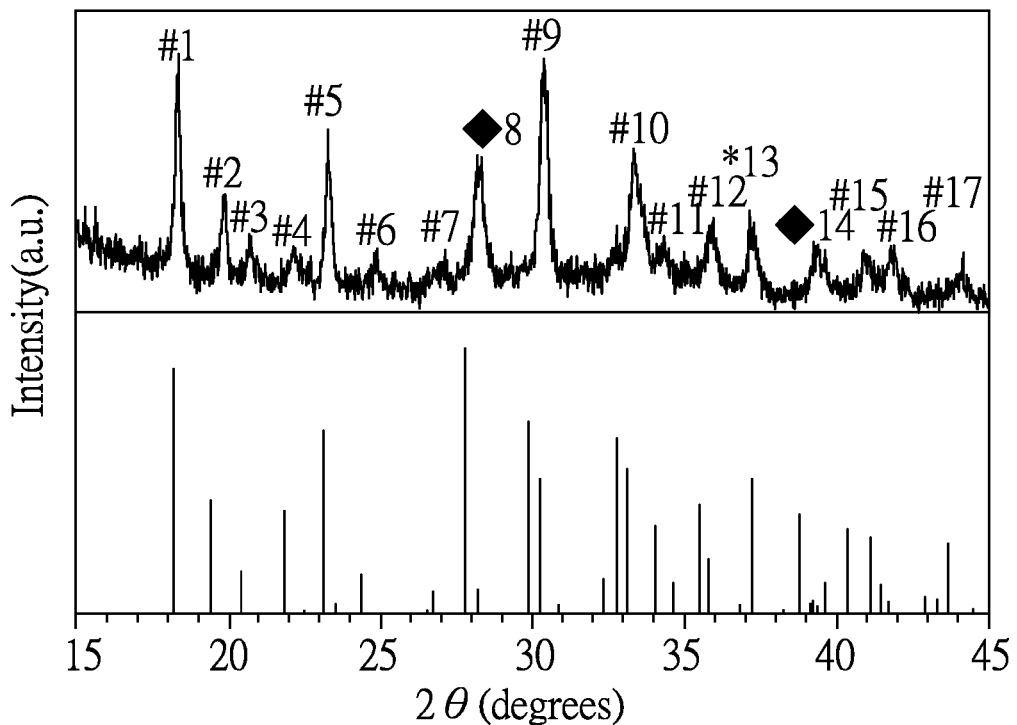
FIG. 10 is an XRD diffraction pattern of ferrous (II) phosphate powders doped with Ni and Mg according to Embodiment 4 of the present invention.

As shown in FIG. 10, a characteristic peak is indicated by symbols "*" (*13), and there is a 0.04° right shift between this peak of the powders of the present embodiment and JCPDS standard. Some characteristic peaks are indicated by symbols "♦" (♦8 and ♦14), which indicate that the intensities of these peaks of the powders of the present embodiment are significantly increased in comparison to those of JCPDS standard. The residue characteristic peaks are indicated by symbols "#", which indicate that there are at least a 0.12° right shift between these peaks of the powders of the present embodiment and JCPDS standard, and the intensities of these peaks of the powders of the present embodiment are also different from intensities of the closest peaks of JCPDS standard, and some of them have weak intensities. The intensities and the 2θ angles (°) of the powders of the present embodiment and JCPDS standard are summarized in the following Table 1, in which 1 indicates the peak intensity of the JCPDS standard and the relative intensity of the observed characteristic peaks of the powders of the present embodiment, wherein "vs" stands for very strong, "s" for strong, "o" for ordinary, "w" for weak, and "vw" stands for very weak.

TABLE 1

| peak | Data 2θ (°) | I | JCPDS Card 079-1928 2θ (°) | I [%] | peak | Data 2θ (°) | I | JCPDS Card 079-1928 2θ (°) | I [%] |
|---|---|---|---|---|---|---|---|---|---|
| #1 | 18.32 | vs | 18.14 | 24.5 | | | | 35.44 | 10.9 |
| #2 | 19.84 | o | 19.39 | 11.3 | #12 | 35.88 | w | 35.74 | 5.3 |
| #3 | 20.72 | vw | 20.38 | 4.2 | | | | 36.76 | 0.8 |
| #4 | 22.12 | vw | 21.81 | 10.3 | *13 | 37.20 | o | 37.16 | 13.4 |
| | | | 22.48 | 0.3 | | | | 38.24 | 0.3 |
| #5 | 23.24 | s | 23.10 | 18.4 | | | | 38.76 | 9.8 |
| | | | 23.51 | 1 | | | | 39.11 | 1 |
| #6 | 24.86 | vw | 24.34 | 3.9 | | | | 39.21 | 1.3 |
| | | | 26.50 | 0.3 | #14 | 39.36 | w | 39.36 | 0.7 |
| #7 | 27.08 | vw | 26.68 | 2.1 | | | | 39.59 | 3.1 |
| | | | 27.76 | 26.7 | | | | 40.34 | 8.4 |
| #8 | 28.24 | s | 28.17 | 2.3 | #15 | 40.94 | w | 41.11 | 7.6 |
| | | | 29.85 | 19.1 | | | | 41.44 | 2.9 |
| #9 | 30.32 | vs | 30.20 | 13.4 | #16 | 41.82 | w | 41.68 | 1.2 |
| | | | 30.84 | 0.9 | | | | 42.87 | 1.7 |
| | | | 32.31 | 3.5 | | | | 43.29 | 1.4 |
| | | | 32.75 | 17.5 | | | | 43.62 | 6.9 |
| #10 | 33.34 | s | 33.05 | 14.4 | #17 | 44.14 | vw | 44.45 | 0.4 |
| #11 | 34.3 | vw | 34.00 | 8.7 | | | | 45.04 | 2.3 |
| | | | 34.58 | 3 | | | | | |

It is known that there might be left shifts of the peaks in the X-ray differaction pattern but the relative intensities thereof are maintained when the lattice constant of the crystal is slightly changed. However, as shown in FIG. 10 and Table 1, there are not only the shifts but also the intesity changes observed in the synthesized ferrous (II) phosphate of the present embodiment. Hence, it can be concluded that the shifts and the intesity changes observed in the synthesized powder of the present embodiment is not only caused by the slight change of the lattice constant of the ferrous (II) phosphate, and the crystal structure thereof is different from that of the standard ferrous (II) phosphate.

Figure 11:
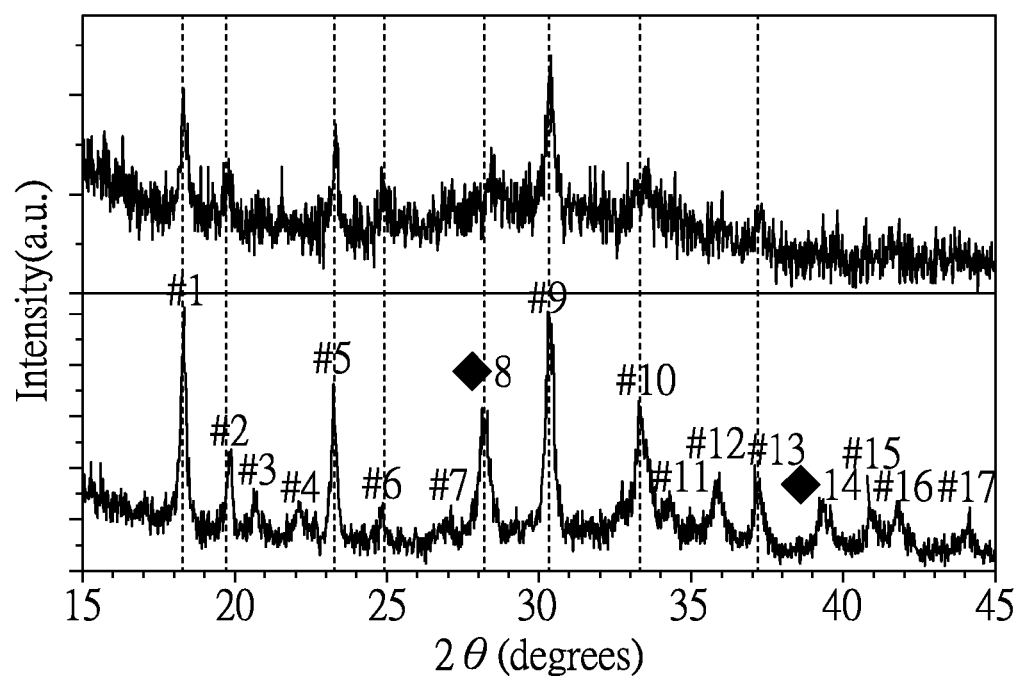
FIG. 11 are XRD diffraction patterns of ferrous (II) phosphate powders doped without or with Ni and Mg according to Embodiments 1 and 4 of the present invention.

In addition, FIG. 11 are XRD diffraction patterns of ferrous (II) phosphate powders doped without or with Ni and Mg according to Embodiments 1 and 4 of the present invention, in which the upper and lower figures are respectively the patterns of powders prepared in Embodiments 1 and 4. It can be found that the intensities and the 2θ degrees of the powders prepared in Embodiments 1 and 4 are almost the same. Especially, the ratio of signal to noise of Embodiment 4 is higher than that of Embodiment 1, and it is because the crystallization degree of the powders of Embodiment 4 is higher than that of Embodiment 1.

Comparative Embodiment

Preparation of Ferrous (II) Phosphate Powders $H_3PO_4$ and $NaHCO_3$ were mixed in a molar ratio of 1:3, and dissolved in deionized water (200 ml) to obtain a P-containing precursor solution. After the P-containing precursor solution was stirred for 30 mins, ferrous sulfate hydrate ($FeSO_4 \cdot 8H_2O$) was added into the P-containing precursor solution, wherein the molar ratio of $FeSO_4 \cdot 8H_2O$ to $H_3PO_4$ was 3:2. After the reaction was completed, the product was washed with an ethanol solution, and then collected with centrifugation for twice. After the collected product was dried at 60° C. for 12 hours, ferrous (11) phosphate precursor powders ($Fe_3(PO_4)_2 \cdot 8H_2O$) were obtained.

Figure 12A:
FIGS. 12A-12C are SEM photos of ferrous (II) phosphate powders according to Comparative Embodiment of the present invention.
Figure 12B:
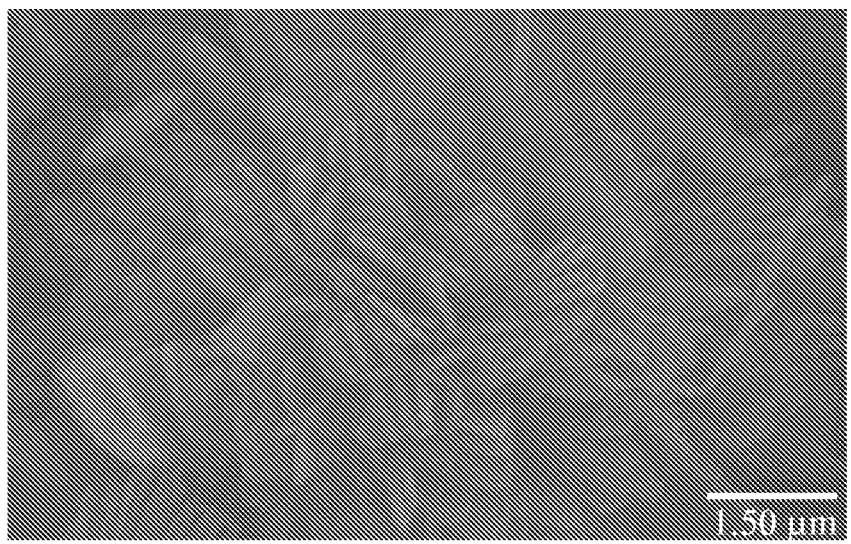
Figure 12C:

The shapes of the ferrous phosphate (II) powders of the present embodiment were observed with a scanning electron microscope (SEM) (Hitachi S-4000), and the results are shown in FIGS. 12A-12C, which are SEM photos of ferrous (II) phosphate powders observed at the magnification of 1,000×, 10,000×, and 10,000×, respectively. As shown in FIG. 12A, the ferrous (II) phosphate powders have flat shapes in macro view. As shown in FIG. 12B, powders composed of independent flakes, and flake powders that one end of each of the flake powders connects to each other to form a connecting center can be observed. As shown in FIG. 12C, flake powders connecting to each other at the center of the flakes can also be observed. Among the observed powders, most of the powders are flake powders that one end of each of the flake powders connects to each other to form a connecting center. In addition, among the observed ferrous (II) phosphate powders, the length (L) of each of the flake powders is about 3-5 μm. The thickness (d) of each of the flake powders is about 120-165 nm, and most of them is about 120-130 nm. After calculation, the ratio of the length to the thickness (L/d) is approximately in a range from 18 to 42.

Figure 13:
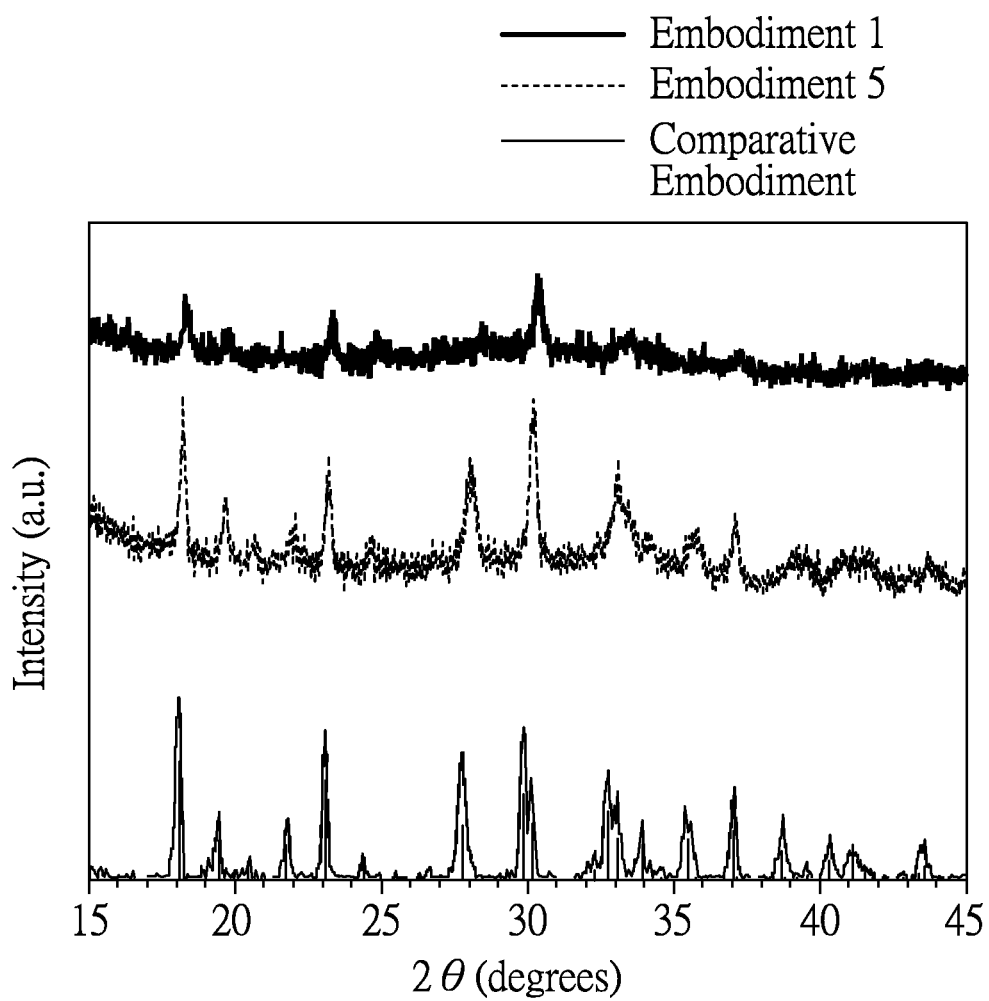
FIG. 13 are XRD diffraction patterns of ferrous (II) phosphate powders according to Embodiments 1 and 5, and Comparative Embodiment of the present invention.

Herein, the X-ray diffraction pattern thereof was also collected through the same process as those described in Embodiment 1, and the result thereof is shown in FIG. 13, wherein the lines shown in the figure indicate the position of the peaks of ferrous (II) phosphate powders JCPDS No. 079-1928. All the peaks observed in the powders of the present comparative embodiment correspond to those of JCPDS, and there are no other peaks observed in the powders of the present comparative embodiment. This result indicates that all the ferrous (II) phosphate powders prepared according to the present embodiment are indeed ferrous (II) phosphate powders.

Preparation of Lithium Iron Phosphate Powders

Next, the ferrous (II) phosphate powders of the present comparative embodiment was used as a precursor, and mixed with $Li_3PO_4$ in a molar ratio of 1:1. In addition, 15 wt % of sugar was also added in the mixture. The mixture was mixed with a 3D shaker containing zirconia balls (1 cm) for 2 hr to obtain mixed powders. Then, the mixed powders were heat-treated at 750° C., under an atmosphere of $N_2$ gas for 3 hrs. Finally, $LiFePO_4$ powders coated with carbon and which were formed in flake shapes, were obtained.

Figure 14:
FIG. 14 is a SEM photo of lithium iron phosphate powders according to Comparative Embodiment of the present invention.

The shapes of the $LiFePO_4$ powders of the present embodiment were observed with a scanning electron microscope (SEM) (Hitachi S-4000), and the results are shown in FIG. 14, which is a SEM photo of $LiFePO_4$ powders observed at the magnification of 20,000×. It can be found that the sintered $LiFePO_4$ powders still have similar shape after the heat-treating process to that of the original ferrous (II) phosphate powders, and most of the powders are flake powders that one end of each of the flake powders connects to each other to form a connecting center. Furthermore, among the observed $LiFePO_4$ powders, the length (L) of each of the flake powders is about 1.2-2 μm, and most of them is about 1.5-1.8 μm. The thickness (d) of each of the flake powders is about 35-140 nm, and most of them is about 100-130 nm.

Embodiment 5

Preparation of Ferrous (II) Phosphate Powders

The ferrous (II) phosphate precursor powders of the present embodiment were prepared through the same process as illustrated in Embodiment 1, except that ferrous sulfate hydrate ($FeSO_4.8H_2O$) was added slowly into the mixture, and the collected product was dried at 55° C. for 36 hours. The obtained ferrous (II) phosphate precursor powders has different length and width.

Figure 15A:
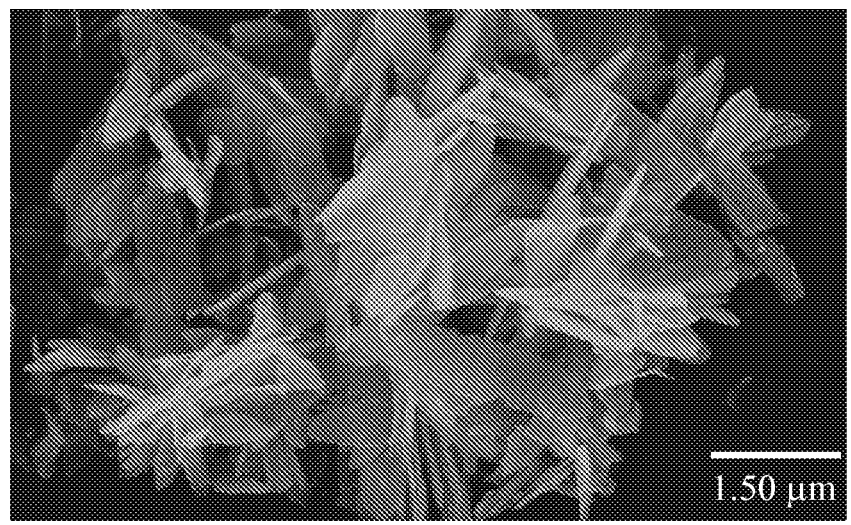
FIGS. 15A-15B are SEM photos of ferrous (II) phosphate powders according to Embodiment 5 of the present invention.
Figure 15B:
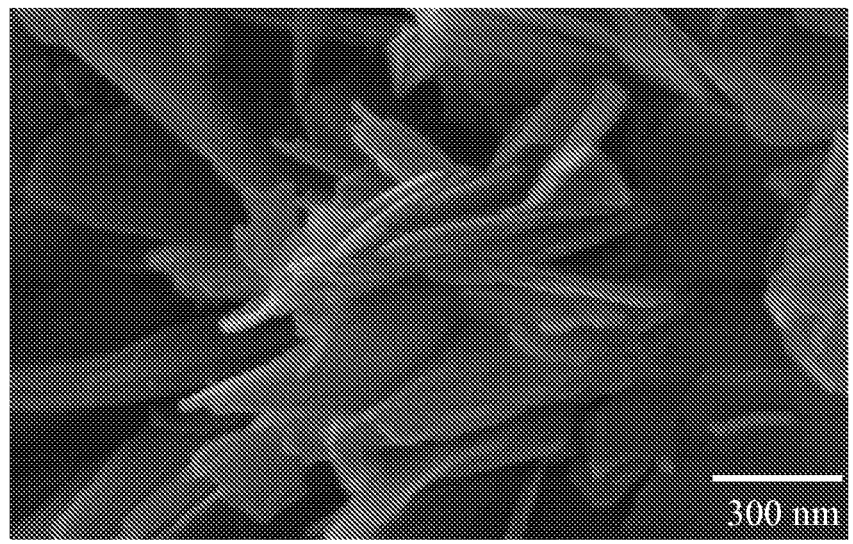

The shapes of the ferrous phosphate (II) powders of the present embodiment were observed with a scanning electron microscope (SEM) (Hitachi S-4000), and the results are shown in FIGS. 15A-15B, which are SEM photos of ferrous (II) phosphate powders observed at the magnification of 10,000×, and 50,000×, respectively. As shown in FIG. 15A, the ferrous (II) phosphate powders have flat shapes in macro view. As shown in FIG. 15B, both powders composed of independent flakes and flake powders in which one end of each of the flake powders connects to each other to form a connecting center are observed. Among the observed powders shown in FIGS. 15A-15B, most of the powders are powders formed in independent flakes; and flake powders that one end of each of the flake powders connects to each other to form a connecting center are secondly observed. Furthermore, among the observed ferrous (II) phosphate powders, the length (L) of each of the flake powders is about 0.9-2.6 μm, and most of them is about 1.5-2 μm. The thickness (d) of each of the flake powders is about 29-35 nm. After calculation, the ratio of the length to the thickness (L/d) is approximately in a range from 25 to 90.

Figure 16:
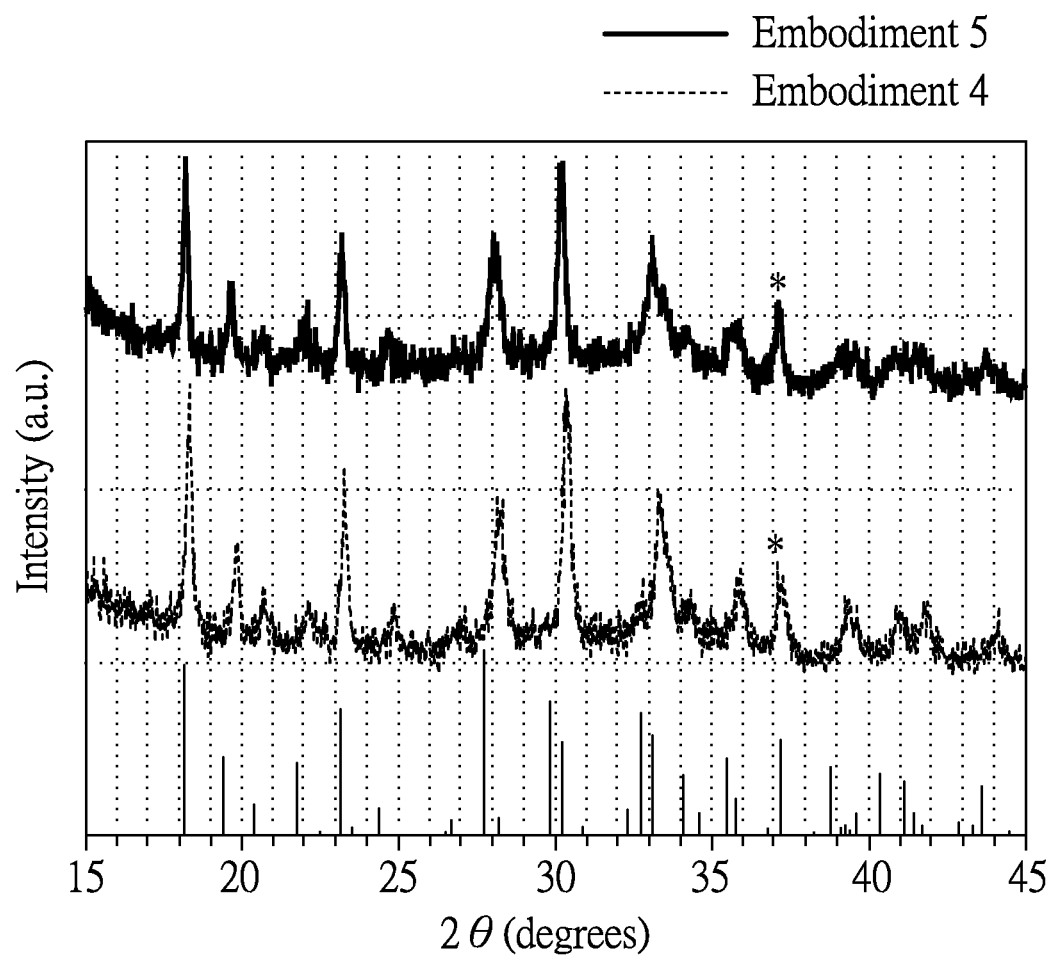
FIG. 16 are XRD diffraction patterns of ferrous (II) phosphate powders according to Embodiments 4 and 5 of the present invention.
Figure 17A:
FIGS. 17A-17D are SEM photos of lithium iron phosphate powders according to Embodiment 5 of the present invention.
Figure 17B:
Figure 17C:
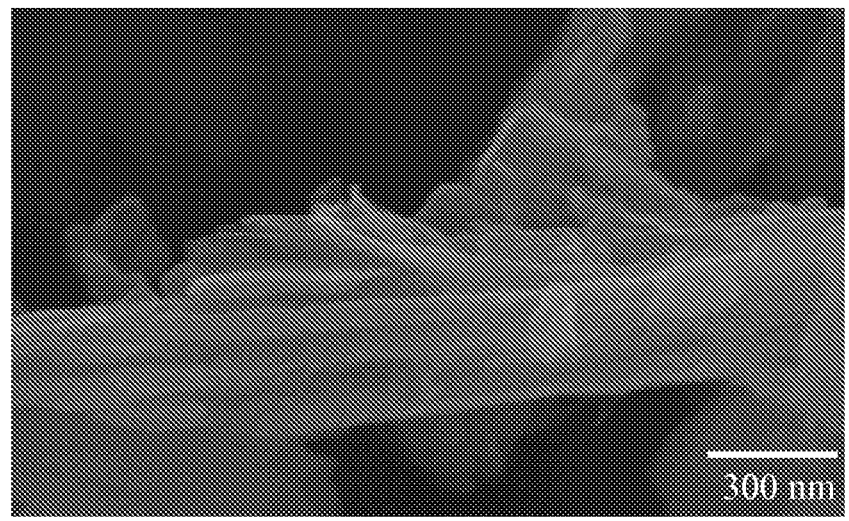
Figure 17D:
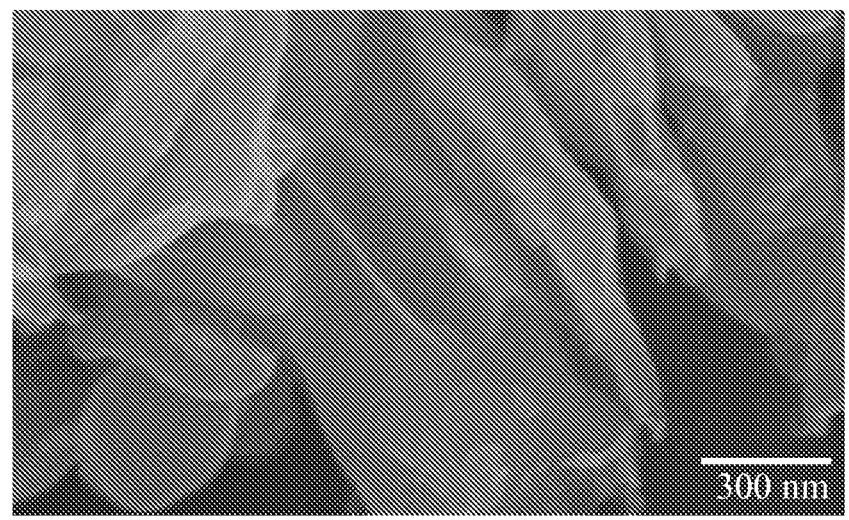

Herein, the X-ray diffraction pattern thereof was also collected through the same process as that described in Embodiment 1, and the result thereof is shown in FIG. 16, wherein the lines shown in the figure indicate the position of the peaks of ferrous (II) phosphate powders JCPDS No. 079-1928. As shown in FIG. 16, only one characteristic peak is indicated by the symbol "*", which indicates that this peak of the powders of the present embodiment corresponds to the peak of ferrous (II) phosphate powders ($Fe_3(PO_4)_2.8H_2O$) (JCPDS No. 079-1928). Other characteristic peaks observed in the powders of the present embodiment cannot consistently correspond to those of JCPDS but have similar 2θ angles to those observed in the powders of Embodiment 4. This result indicates that the crystal structure of the powders of Embodiment 4 and the present embodiment is different from that of the standard ferrous (II) phosphate (JCPDS No. 079-1928).

In addition, as shown in FIG. 13, the signal to noise of the present embodiment is higher than that of Embodiment 1, and it is because the thickness of the powders of the present embodiment is larger than that of Embodiment 1.

Preparation of Lithium Iron Phosphate Powders

The lithium iron phosphate powders of the present embodiment were also prepared through the same process as illustrated in Comparative Embodiment, except that the ferrous (II) phosphate powders of the Comparative Embodiment was substituted with those of the present embodiment, and the 1 cm zirconia balls were substituted with 2 mm zirconia balls.

The shapes of the $LiFePO_4$ powders of the present embodiment were observed with a scanning electron microscope (SEM) (Hitachi S-4000), and the results are shown in FIGS. 17A-17D, which are SEM photos of $LiFePO_4$ powders observed at the magnification of 50,000×. As shown in FIGS. 17A-17D, the sintered $LiFePO_4$ powders still have similar shape after the heat-treating process to that of the original ferrous (II) phosphate powders. As shown in FIGS. 17A-17D, flake powders with partially cured peripheries can be found, some of the flake powders are transparent or semi-transparent, and most of the powders are powders formed independent flakes. In addition, even though the time for performing the sintering process is short, all the ferrous (II) phosphate powders can be transformed into $LiFePO_4$, due to the uniform and small grain size of the ferrous (II) phosphate powders. Furthermore, among the observed $LiFePO_4$ powders, 90% of them have flake shapes and the thickness thereof is thicker than that of ferrous (II) phosphate powders. In addition, the length (L) of each of the flake powders is about 0.5-1.5 μm, and most of them is about 0.5-1 μm. The thickness (d) of each of the flake powders is about 34-45 nm. After calculation, the ratio of the length to the thickness (L/d) is approximately in a range from 11 to 45. Furthermore, 10% of the flake powder has a thickness of about 15 nm.

Embodiment 6

Preparation of Lithium Iron Phosphate Powders

The lithium iron phosphate powders of the present embodiment were also prepared through the same process as illustrated in Comparative Embodiment, except that the ferrous (II) phosphate powders of the Comparative Embodiment was substituted with those of Embodiment 1, and the 2 mm zirconia balls were substituted with 0.8 mm zirconia balls.

Figure 18:
FIG. 18 is a SEM photo of lithium iron phosphate powders according to Embodiment 6 of the present invention.

The shapes of the $LiFePO_4$ powders of the present embodiment were observed with a scanning electron microscope (SEM) (Hitachi S-4000), and the results are shown in FIG. 18, which is a SEM photo of $LiFePO_4$ powders observed at the magnification of 50,000×.

As shown in FIG. 18, the sintered $LiFePO_4$ powders still have similar shape after the heat-treating process to that of the original ferrous (II) phosphate powders. As shown in FIG. 18, flake powders with partially cured peripheries can be found, some of the flake powders are transparent or semi-transparent, and most of the powders are powders formed in independent flakes. In addition, even though the time for performing the sintering process is short, all the ferrous (II) phosphate powders can be transformed into $LiFePO_4$, due to the uniform and small grain size of the ferrous (II) phosphate powders. Furthermore, among the observed $LiFePO_4$ powders, the length thereof is shorter than that of ferrous (II) phosphate powders, and the thickness thereof is thinner than that of ferrous (II) phosphate powders. In addition, the length (L) of each of the flake powders is about 0.2-1.7 μm, and most of them is about 0.4-1.1 μm. The thickness (d) of each of the flake powders is about 7-9 nm. After calculation, the ratio of the length to the thickness (L/d) is approximately in a range from 20 to 250.

Figure 19:
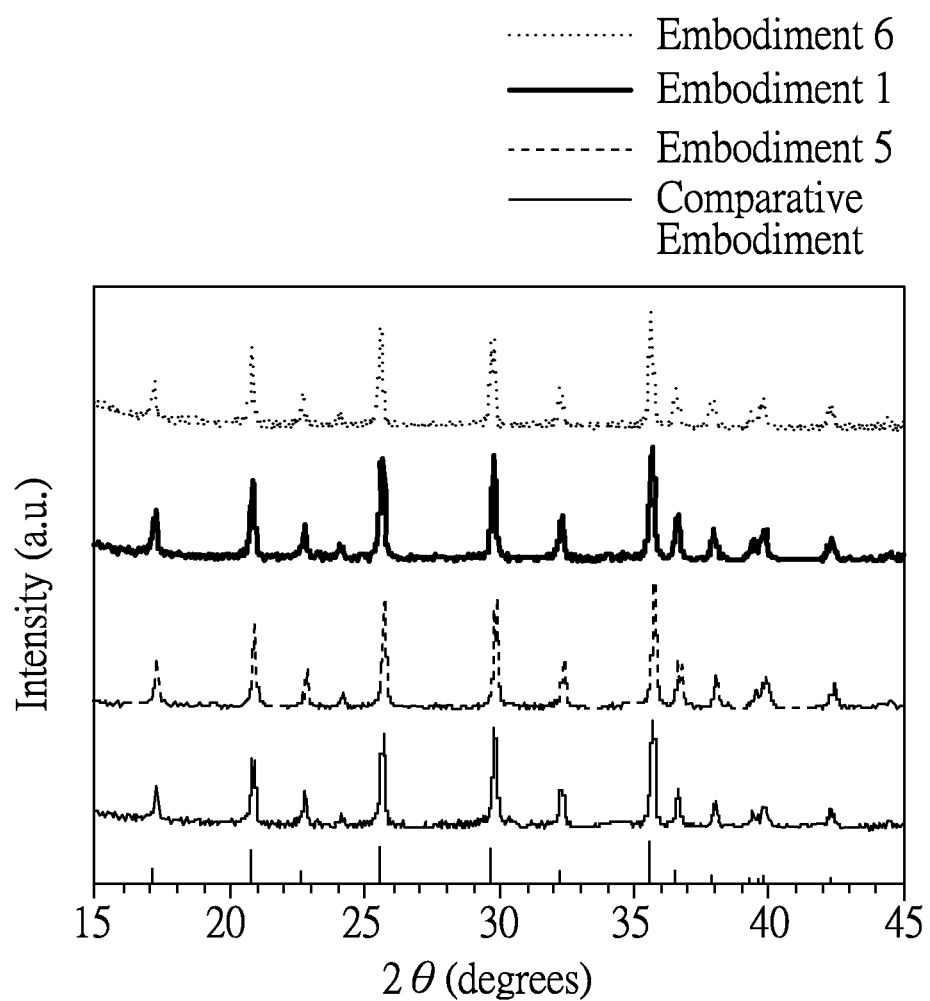
FIG. 19 are XRD diffraction patterns of lithium iron phosphate powders according to Embodiments 1, 5 and 6, and Comparative Embodiment of the present invention.

In addition, the X-ray diffraction patterns of $LiFePO_4$ powders obtained in Embodiments 5 and 6, and Comparative Embodiment were also collected through the same process as that described in Embodiment 1, and the result thereof is shown in FIG. 19, wherein the lines shown in the figure indicate the position of the peaks of $LiFePO_4$ (JCPDS No. 081-1173). As shown in FIG. 19, all the lines indicating the peaks of the $LiFePO_4$ powders of Embodiments 5 and 6, and Comparative Embodiment correspond to the peaks of $LiFePO_4$ crystal with the olivine structure (JCPDS No. 081-1173), and there are no other peaks observed in the $LiFePO_4$ powders of Embodiments 5 and 6, and Comparative Embodiment. This result indicates that all the $LiFePO_4$ powders of the Embodiments 5 and 6, and Comparative Embodiment are $LiFePO_4$ powders with olivine structures.

According to the results of Embodiments 1-5, the ferrous (II) phosphate powders have small and uniform grain size. When these ferrous (II) phosphate powders are used as a precursor for preparing lithium ion phosphate powders, the time for the heat-treating process can be shortened. Hence, the cost for manufacturing the Li-ion batteries can be further reduced. In addition, the sintered lithium ion phosphate powders have similar shape to that of ferrous (II) phosphate powders, so the sintered lithium ion phosphate powders also have small and uniform grain size. Hence, the grinding process and the sieving process can be omitted during the process for preparing the cathode materials, so the cost of Li-ion batteries can be reduced. Furthermore, the lithium iron phosphate powders of the present invention have nano, micro, or sub-micro grain size. When the lithium iron phosphate powders of the present invention are used as cathode materials of Li-ion batteries, the Li-ion batteries can exhibit uniform charging and discharging current, and excellent charge/discharge efficiency. Hence, not only the cost of the Li-ion batteries can be reduced, but also the charge/discharge time can be shortened and the capacity of the batteries can be further improved.

Preparation and Tesing of Li-Ion Batteries

The Li-ion battery of the present invention was prepared through the conventional manufacturing method thereof. Briefly, PVDF, $LiFePO_4$ prepared in Embodiments 1, 5-6, or Comparative Embodiment of the present embodiment, ZrO, KS-6 [TIMCAL] and Super-P [TIMCAL] were dried in a vacuum oven for 24 hr, and a weight ratio of $LiFePO_4$:PVDF:KS-6:Super-P was 85:10:3:2. Next, the aforementioned materials were mixed with a 3D miller containing NMP to obtain slurry. An Al foil was provided and coated with the slurry through a blade coating process, and then placed in a vacuum oven at 90° C. for 12 hr. The dried foil coated with the slurry was pressed by a roller, and cut into Φ13 mm circular plates.

Figure 20:
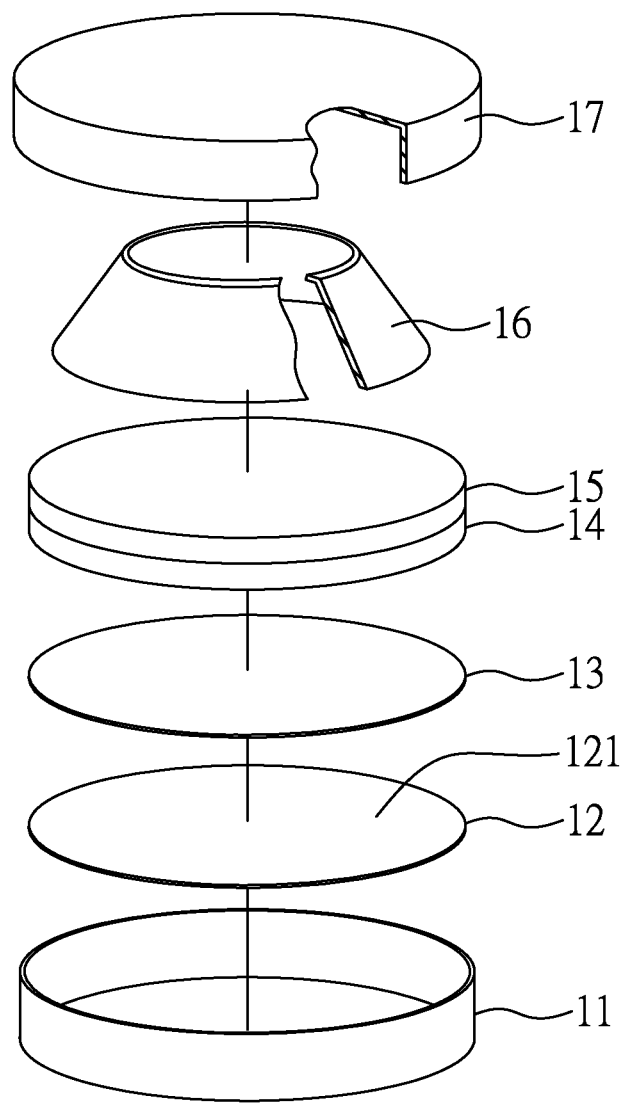
FIG. 20 is a perspective view showing a Li-ion battery according to the present invention.

Next, as shown in FIG. 20, an upper cap 17, a lower cap 11, a widemouth plate 16, a pad 15, the aforementioned circular plate 12 with the slurry coated on a surface 121 thereof, and a Φ18 mm separator 13 are placed in a vacuum oven at 90° C. for 24 hr, and then placed into a glove box with less than 1 ppm of water and $O_2$ under Ar environment. Then, the circular plate 12, the separator 13, a Li-plate 14, the pad 15, the widemouth plate 16 and the upper cap 17 were sequentially laminated on the lower cap 11, as shown in FIG. 20. After pressing and sealing, a coin type CR2032 Li-ion battery was obtained, and tested after 12-30 hr.

The obtained Li-ion batteries prepared by $LiFePO_4$ of Embodiments 1, 5-6, or Comparative Embodiment were tested with automatic cell charge-discharge test system (AcuTech Systems BAT-750B). First, the batteries were activated, and charged with constant voltage 3.65V, 0.1 C. When the charge current was less than 0.02 mA or the charging capacity reached 2 mAh, the batteries were discharged with constant current 0.1 C until the voltage thereof was 2V. After the aforementioned steps were performed for several times, the constant voltage for charging was increased to 3.9V, and the other conditions were maintained. After the steps were performed using the constant potential of 3.9V for several times, the constant potential for charging was further increased to 4.2 V, and the other conditions were maintained. After the steps were performed using the constant voltage of 4.2V for several times, the charging current was sequentially increased to 0.2 C, 0.5 C, 0.75 C and 1 C, and the other conditions were maintained. The batteries charged with different charge current were tested after the batteries were charged and discharged for several times.

After the Li-ion batteries were charged with constant potential 4.2V, 0.75 C, and the discharge testing were performed at three different constant current (0.1 C, 0.2 C and 0.5 C) when the charge current was less than 0.02 mA. The discharge was set to stop when the voltage of the constant current discharge was 2V, and each discharge current was tested by two charge/discharge cycles. The results thereof are shown in FIG. 21.

Figure 21:
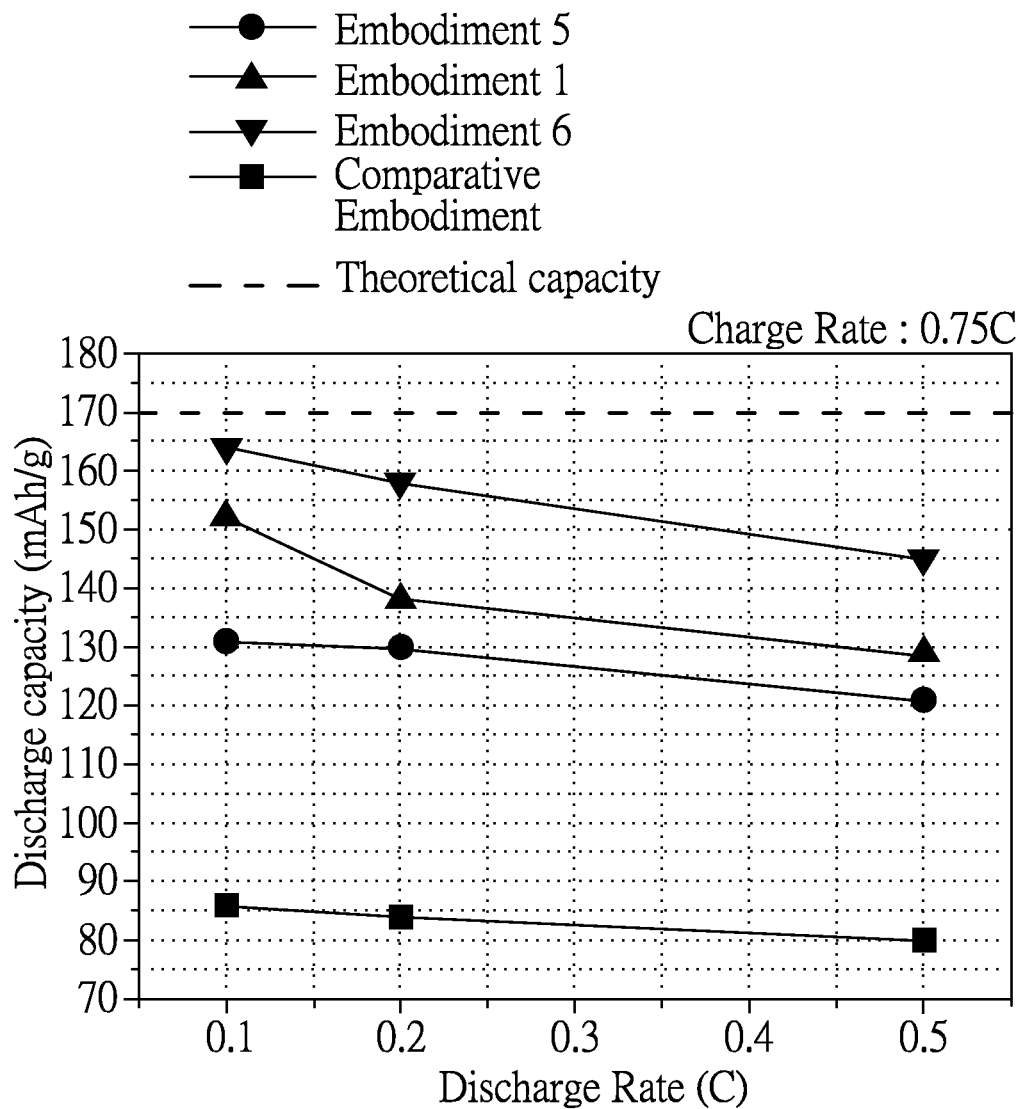
FIG. 21 shows the capacities of Li-ion batteries prepared with lithium iron phosphate powders according to Embodiments 1, 5 and 6, and Comparative Embodiment of the present invention.

As shown in FIG. 21, the discharge capacities of the batteries prepared with the $LiFePO_4$ of Comparative Embodiment (thickness=100-130 nm) decreased from 83 mAh/g of 0.1 C discharge current, 81 mAh/g of 0.2 C discharge current, to 76 mAh/g of 0.5 C discharging current. The discharge capacities of the batteries prepared with the $LiFePO_4$ of Embodiment 5 (thickness=34-45 nm) decreased from 131 mAh/g of 0.1 C discharge current, 130 mAh/g of 0.2 C discharge current, to 121 mAh/g of 0.5 C discharge current. The discharge capacities of the batteries prepared with the $LiFePO_4$ of Embodiment 1 (thickness=8-20 nm) decreased from 152 mAh/g of 0.1 C discharge current, 138 mAh/g of 0.2 C discharge current, to 129 mAh/g of 0.5 C discharge current. In addition, the discharge capacities of the batteries prepared with the $LiFePO_4$ of Embodiment 6 (thickness=7-9 nm) decreased from 164 mAh/g of 0.1 C discharge current, 158 mAh/g of 0.2 C discharge current, to 145 mAh/g of 0.5 C discharge current.

Although the XRD patterns of the $LiFePO_4$ of Embodiments 1, 5-6, and Comparative Embodiment are almost the same (as shown in FIG. 19), the Li-ion batteries prepared with the same have different performances (as shown in FIG. 21). These results indicate that the performances of the batteries are highly related to the sizes and the shapes of the $LiFePO_4$ powders.

It should be noted that the $LiFePO_4$ powders of Embodiment 6 has the smallest thickness and length, and the Li-ion batteries prepared with the same has the highest capacity. Especially, the capacity thereof under 0.1 C discharge current was about 164 mAh/g, which is close to the theoretical value of 170 mAh/g; and showed better performance than that prepared with $LiFePO_4$ of Comparative Embodiment (83 mAh/g under 0.1 C discharge current). These results indicate that the capacities of the Li-ion batteries are highly related to the thickness of the $LiFePO_4$ flake powders, and the capacities thereof are increased as the thickness of the powders decreased.

Figure 22:
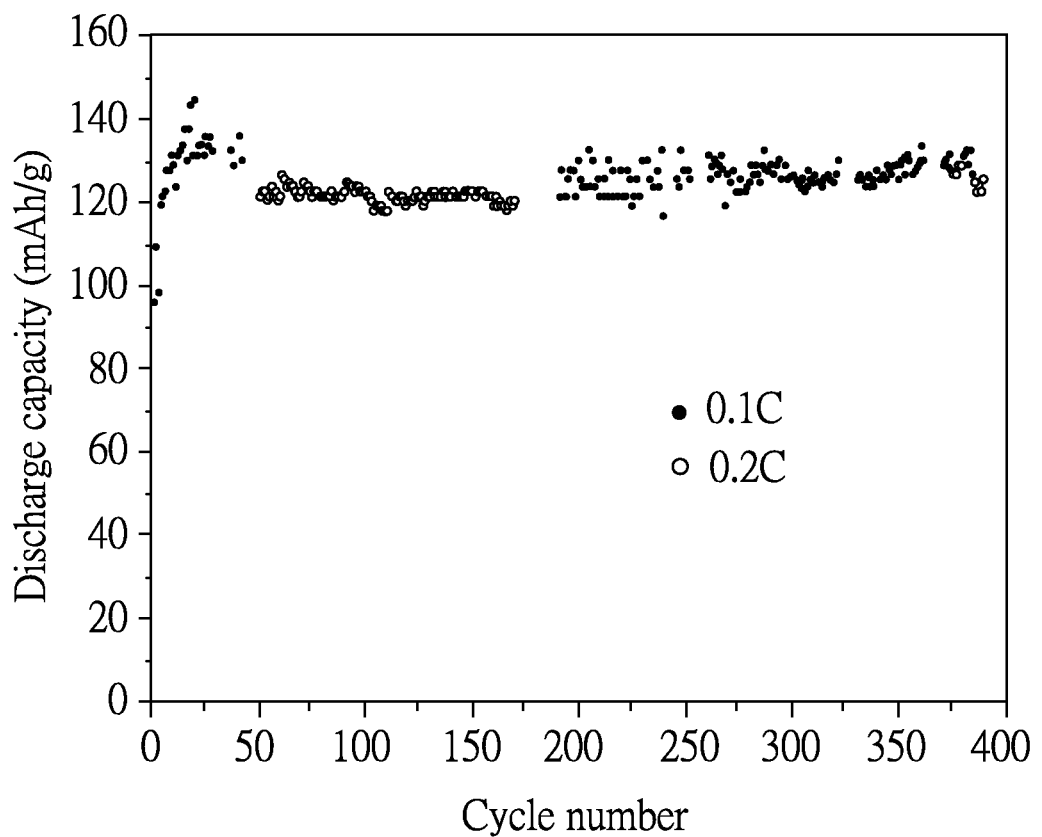
FIG. 22 shows the capacities of a Li-ion battery prepared with lithium iron phosphate powders according to Embodiment 5 of the present invention.

FIG. 22 shows the capacities of a Li-ion battery prepared with lithium iron phosphate powders according to Embodiment 5 of the present invention, wherein the solid dots and the circles respectively indicate the discharge capacities under 0.1 C and 0.2 C. The discharge current of different cycle may be varied. The charge current was 0.1 C, 0.2 C, 0.5 C, 0.75 C or 1 C and the discharge current was mostly 0.1 C at 1-50 cycles and after 170 cycles. The charge current was mostly 0.75 C and the discharge current was mostly 0.2 C at 51-170 cycles and 375-390 cycles. As shown in FIG. 22, there is no significant decay of capacities observed in the Li-ion battery prepared with the LiFePO$_4$ of Embodiment 5 after charge and discharge for 390 cycles.

Figure 23:
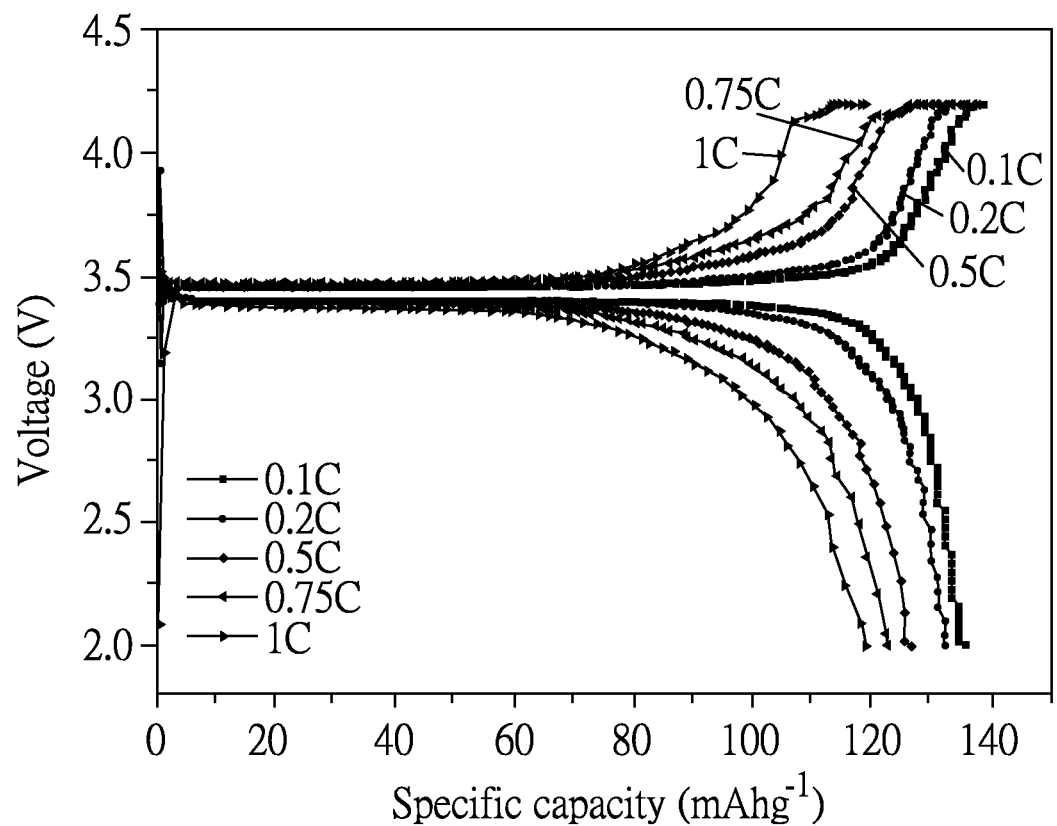
FIG. 23 shows the relation between the potential and the capacities of a Li-ion battery prepared with lithium iron phosphate powders according to Embodiment 5 of the present invention.

FIG. 23 shows the relation between the voltage and the capacities of a Li-ion battery prepared with lithium iron phosphate powders according to Embodiment 5 of the present invention, which was tested by the same charge and discharge current (0.1 C, 0.2 C, 0.5 C, 0.75 C and 1 C) at 27-36 cycles. From the results shown in FIG. 23, it can be found that the voltages of the batteries can be maintained during the charge and discharge process, and there are no significant difference observed between the voltages of the charge and the discharge process. These results indicate the polarization is not significant in the Li-ion battery prepared with lithium iron phosphate powders according to Embodiment 5 of the present invention.

In conclusion, the ferrous (II) phosphate powders of the present invention have thin thickness, and high length to thickness ratio. Hence, the time for preparing LiFePO$_4$ powders can be greatly reduced. In addition, when the obtained LiFePO$_4$ powders are further applied to prepare Li-ion batteries, the performance of the batteries can be greatly improved.

Although the present invention has been explained in relation to its preferred embodiment, it is to be understood that many other possible modifications and variations can be made without departing from the spirit and scope of the invention as hereinafter claimed.

What is claimed is:

1. Ferrous (II) phosphate powders for manufacturing a cathode material of a Li-ion battery, represented by the following formula (I):

$$Fe_{(3-x)}M_x(PO_4)_2 \cdot yH_2O \qquad (I)$$

wherein M comprises at least one metal selected from the group consisting of Mn, Cr, Co, Cu, Ni, V, Mo, Ti, Zn, Zr, Tc, Ru, Rh, Pd, Ag, Cd, Pt, Au, Al, Ga, In, Be, Mg, Ca, Sr, B, and Nb, 0≤x≤1.5, y is an integer of 0 to 8, the ferrous (II) phosphate powders are composed of plural flake powders, the length of each of the flake powders is 0.2-10 μm, and a ratio of the length and the thickness of each of the flake powder is in a range from 14 to 500.

2. The ferrous (II) phosphate powders as claimed in claim 1, wherein the thickness of each of the flake powder is 1-50 nm.

3. The ferrous (II) phosphate powders as claimed in claim 1, wherein the flake powders are powders composed of independent flakes, flake powders that one end of each of the flake powders connects to each other, flake powders connecting to each other at the center of the flakes, or flake powders that one end of each of the flake powders connects to each other to form a connecting center.

4. The ferrous (II) phosphate powders as claimed in claim 3, wherein the flakes in the flake powders are independent flakes.

5. The ferrous (H) phosphate powders as claimed in claim 3, wherein one end of each of the flake powders connects to each other to form a connecting center.

6. The ferrous (II) phosphate powders as claimed in claim 1, which are crystallized ferrous (II) phosphate powders.

7. The ferrous (II) phosphate powders as claimed in claim 6, which shows an X-ray diffraction pattern 2θ angles (°) having characteristic peaks at about 18.32, 19.84, 23.24, 28.24, 30.32, 33.34, 35.88, 37.20, 39.36, 40.94, and 41.82.

8. The ferrous (II) phosphate powders as claimed in claim 7, which shows an X-ray diffraction pattern 2θ angles (°) having further characteristic peaks at about 20.72, 22.12, 24.86, 27.08, 34.3, and 44.14.

9. The ferrous (II) phosphate powders as claimed in claim 1, wherein M comprises at least one metal selected from the group consisting of Mn, Cr, Co, Cu, Ni, Zn, Al, and Mg.

10. The ferrous (II) phosphate powders as claimed in claim 1, which has a crystallization degree of more than 10%.

11. The ferrous (II) phosphate powders as claimed in claim 1, wherein 0≤x<0.5.

12. The ferrous (II) phosphate powders as claimed in claim 1, wherein the length of each of the flake powders is 0.3-5 μm.

13. The ferrous (II) phosphate powders as claimed in claim 1, wherein the length of each of the flake powders is 0.5-4 μm.

* * * * *